US008665458B2

(12) United States Patent  (10) Patent No.: US 8,665,458 B2
Ozawa et al.  (45) Date of Patent: Mar. 4, 2014

(54) IMAGE FORMING APPARATUS INCLUDING A CONTROL UNIT THAT GENERATES PRINT DATA BY CARRYING OUT A RASTERIZING PROCESS BASED ON A DISPLAY LIST, AND COMPUTER READABLE RECORDING MEDIUM

(75) Inventors: Masahiro Ozawa, Hino (JP); Fumihito Akiyama, Yokohama (JP); Jun Kuroki, Superior, CO (US); Takahisa Matsunaga, Hino (JP); Hiroshi Nogawa, Hachioji (JP); Yasufumi Aoyama, Hino (JP); Kunikazu Satou, Tama (JP); Yasutaka Shimohara, Hachioji (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 351 days.

(21) Appl. No.: 13/013,166

(22) Filed: Jan. 25, 2011

(65) Prior Publication Data

US 2011/0235105 A1  Sep. 29, 2011

(30) Foreign Application Priority Data

Jan. 25, 2010  (JP) ................. 2010-012677

(51) Int. Cl.
*G06F 3/12*  (2006.01)
*G06F 9/40*  (2006.01)
*G06K 15/00*  (2006.01)
*G06F 9/00*  (2006.01)

(52) U.S. Cl.
USPC .......... 358/1.13; 358/1.16; 712/203; 712/212

(58) Field of Classification Search
USPC ................. 358/1.13, 1.16; 712/203, 212
See application file for complete search history.

(56) References Cited

U.S. PATENT DOCUMENTS 6,052,200 A * 4/2000 Mitani ................. 358/1.16
2003/0231330 A1 * 12/2003 Westervelt et al. ......... 358/1.13

FOREIGN PATENT DOCUMENTS

| JP | 10-307689 A | 11/1998 |
| JP | 11-058854 A | 2/1999 |
| JP | 2000-158727 A | 6/2000 |
| JP | 2002-132466 A | 5/2002 |
| JP | 2003-051019 A | 2/2003 |
| JP | 2006-155308 A | 6/2006 |

OTHER PUBLICATIONS

Japanese Office Action mailed Apr. 16, 2013. Application No. 2010-012677 with English Translation.

* cited by examiner

*Primary Examiner* — Fred Guillermety
(74) *Attorney, Agent, or Firm* — Buchanan Ingersoll & Rooney PC

(57) ABSTRACT

Disclosed is an image forming apparatus which generates print data based on control data for page print inputted from an external device and which forms an image based on the print data. The image forming apparatus includes a control unit having a plurality of arithmetic processing units, and an image forming unit for forming an image based on the print data which is outputted by the control unit. The control unit generates the print data by carrying out a rasterizing process of one page in band unit constituted by a predetermined number of lines based on the control data for page print and sequentially outputs the generated print data at output timings defined in a constant output interval, wherein the rasterizing process is controlled based on whether or not generation of print data is to be completed within the output interval for all of bands in the one page.

5 Claims, 21 Drawing Sheets

FIG.12

| OBJECT TYPE | ESTIMATED TIME (msec) / AREA(1000pixel) |
|---|---|
| TEXT | 1 |
| GRAPHICS | 1.5 |
| IMAGE IN WHICH ENLARGING PROCESS DOES NOT OCCUR | 2 |
| IMAGE IN WHICH ENLARGING PROCESS OCCURS | 10 |
| IMAGE IN WHICH ROTATING PROCESS OCCURS | 6 |
| GRADATION | 5 |

FIG.13

| OBJECT NO. | OBJECT TYPE | AREA(pixel) | ESTIMATED TIME(ms) |
|---|---|---|---|
| 1 | TEXT | 6000 | 6 |
| 2 | TEXT | 2000 | 2 |
| 3 | GRADATION | 20000 | 30 |
| 4 | IMAGE IN WHICH ENLARGING PROCESS OCCURS | 1000000 | 10000 |
| 5 | IMAGE IN WHICH ENLARGING PROCESS OCCURS | 2000000 | 20000 |
| ⋮ | ⋮ | ⋮ | ⋮ |
| N | GRAPHICS | 40000 | 60 |

IMAGE FORMING APPARATUS INCLUDING A CONTROL UNIT THAT GENERATES PRINT DATA BY CARRYING OUT A RASTERIZING PROCESS BASED ON A DISPLAY LIST, AND COMPUTER READABLE RECORDING MEDIUM

BACKGROUND OF THE INVENTION

1. Field of the Invention

The present invention relates to an image forming apparatus and a computer readable recording medium.

2. Description of Related Art

Image processing apparatuses such as a printer, MFP (Multi Function Peripheral) and the like which carry out printing by receiving print data such as PS (PostScript (registered trademark)) data, PDF (Portable Document Format) data and the like created in an external apparatus such as a PC (Personal Computer) and the like via a network such as LAN, converting the received data to data of intermediate format (intermediate data) temporarily and generating bitmap data by rasterizing the intermediate data is becoming widely used.

In such image processing apparatus, in order to reduce memory capacity, print data of one page is divided in a plurality of bands when converting the print data of the page to intermediate data, bitmap data is generated in band unit based on the intermediate data and the bitmap data is sequentially transmitted upon request by an image forming unit which carries out image forming.

Here, processing time needed for rasterizing depends on a level of complication of the intermediate data. Further, because transmission of bitmap data needs to be executed at every predetermined time along with forming of an image in the image forming unit, the transmission of bitmap data cannot be carried out at the timing requested by the image forming unit when the processing time needed for rasterizing is too long and missing of image (overrun) occurs.

That is, for example, as shown in FIG. 22, print data of one page is converted to intermediate data such as a display list and this intermediate data is divided in a plurality of bands. As for the first band B1 to the fourth band B4 among the divided bands, rasterizing can be completed before the timing (t1 to t4) requested by the image forming unit and bitmap data can be transmitted. However, as for the fifth band B5, the intermediate data is complicated and rasterizing cannot be completed in time for the timing requested by the image forming unit, and bitmap data cannot be transmitted. In such case, an image of the object in which rasterizing is not completed will be missing.

In view of the above problem, among conventional image processing apparatuses, JP H10-307689 discloses an image processing apparatus which estimates rasterizing time for each band at the time when analyzing input data. Further, the above image processing apparatus restructures the construction of the intermediate data or carries out rasterizing in page unit for the band which is determined that rasterizing cannot be finished in time for the timing requested by the image forming unit to prevent overrun from occurring.

Moreover, JP2003-51019 discloses an image processing apparatus which attempts to enhance processing capacity by carrying out rasterizing in parallel in a plurality of bands by using a plurality of CPU.

However, in the image processing apparatus described in the above JP H10-307689, the process is increased when the intermediate data is restructured and rather decreases image forming speed. Further, when it is changed so as to carry out rasterizing in page unit, cost increases because a memory region for storing bitmap data is needed and activation of the image forming unit will be delayed, therefore, again, image forming speed will be decreased.

Moreover, in the image processing apparatus described in the above JP2003-51019, speed of rasterizing can be enhanced, however, because image forming speed in the image forming unit is constant, the performance will not be enhanced even when rasterizing can be carried out before the timing requested by the image forming unit more than needed. In contrary, a memory region for storing the bitmap data which is generated too early is needed and as a result, cost increases.

SUMMARY

In order to solve at least one of the above problems, an image forming apparatus reflecting one aspect of the present invention which generates print data based on control data for page print which is inputted from an external device and which forms an image based on the print data includes a control unit including a plurality of arithmetic processing units, wherein the control unit generates the print data by carrying out a rasterizing process of one page in band unit constituted by a predetermined number of lines based on the control data for page print and sequentially outputs the generated print data at output timings defined in a constant output interval and an image forming unit for forming an image based on the print data which is outputted by the control unit, and when the control unit determines that generation of print data is to be completed within the output interval for all of bands in the one page, the control unit designates any one arithmetic processing unit among the plurality of arithmetic processing units to carry out rasterizing process of each band, starts the rasterizing process of each band by the designated arithmetic processing unit from a first band in the constant output interval to generate print data and outputs the generated print data at an output timing corresponded to each band, and when the control unit determines that a generation of print data is not to be completed within the output interval for any one band in the one page, the control unit executes a rasterizing process for one or a plurality of bands by using two or more arithmetic processing units among the plurality of arithmetic processing units in parallel to generate print data so that the generation of the print data of the one band is to be finished in time for an output timing corresponded to the one band, and the control unit outputs the generated print data at the output timing corresponded to the one band.

Further, preferably in the above image forming apparatus, when the control unit determines that generation of print data is not to be completed within the output interval for any one band in the one page even when the generation of the print data of the one band is carried out in parallel at same time in two or more arithmetic processing units among the plurality of arithmetic processing units, the control unit generates the print data of the one band before carrying out a rasterizing process of a first band.

Furthermore in the above image forming apparatus, the control unit calculates a processing time needed for generating print data based on the control data for page print, and when the processing time is greater than the output interval, the control unit determines that the print data is not to be generated within the output interval.

Moreover, in the above image forming apparatus, when the control unit determines that print data is not to be generated within the output interval, the control unit decides which arithmetic processing units are available to generated the print data among the plurality of arithmetic processing units, and the control unit executes a rasterizing process for one or a plurality of bands in parallel by at least two or more of the arithmetic processing units which are decided as being available to generate the print data.

Further, in the above image forming apparatus, when the control unit determines that generation of the print data is not to be completed within the output interval, while generation of print data of other band is carried out in one arithmetic processing unit, the control unit executes the generation of the print data in parallel by one or more of other arithmetic processing units for a band which is determined that the generation of the print data is not to be completed within the output interval.

BRIEF DESCRIPTION OF THE DRAWINGS

The present invention will become more fully understood from the detailed description given hereinbelow and the appended drawings, and thus are not intended as a definition of the limits of the present invention, and wherein:

FIG. 12 is a diagram showing a table for calculating a rasterizing estimate time;

FIG. 13 is a diagram for explaining rasterizing estimate time of each object;

DESCRIPTION OF THE PREFERRED EMBODIMENTS

Figure 1:
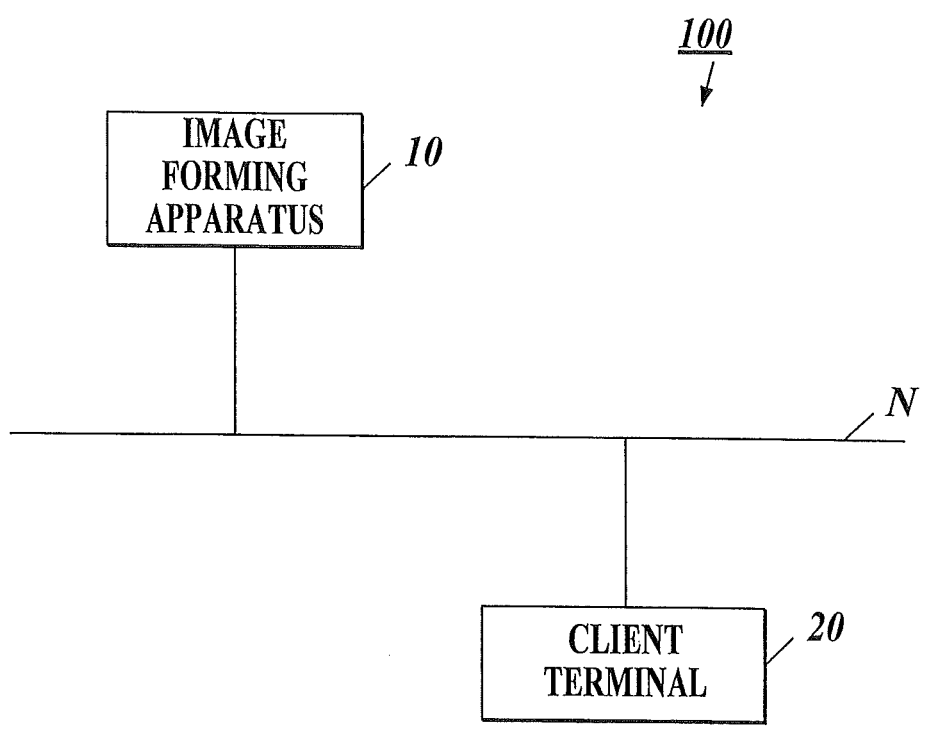
FIG. 1 is a system configuration diagram of an image forming system.

Hereinafter, embodiments of an image processing apparatus according to the present invention will be described with reference to the drawings. Here, scope of the invention is not limited to the examples shown in the drawings.

(First Embodiment)

FIG. 1 shows a system configuration of the image forming system 100 of the first embodiment. As shown in FIG. 1, for example, the image forming system 100 includes an image forming apparatus 10 and a client terminal 20. The image forming apparatus 10 and the client terminal 20 are connected to each other via a communication network such as LAN (Local Area Network) so that data can be communicated.

The image forming apparatus 10 is a so-called MFP (Multi-Functional Peripheral) including a copy function, an image reading function and a printer function. For example, the image forming apparatus 10 includes a photoreceptor drum for each color of CMYK and an tandem image processing apparatus which carries out printing by conveying an paper at the same time as forming an image to the photoreceptor drum can be applied as the image forming apparatus 10. Further, the image forming apparatus 10 may be an image processing apparatus for forming a monochrome image only having a photoreceptor drum of single color. The image forming apparatus 10 forms an image on a paper based on print job data which is transmitted from the client terminal 20, image data read by an image reading unit such as a scanner provided in the image forming apparatus 10 and the like.

The client terminal 20 is a so-called personal computer and includes a function to transmit print job to the image forming apparatus 10. In the client terminal 20, a printer driver program (hereinafter, merely called printer driver in some occasion) is installed. The client terminal 20 generates print job data including data (print request data and the like) of print condition which is to be applied at the time of image forming by using the function of printer driver, control data for page printing (image data and the like) and the like and transmits the generated data to the image forming apparatus 10. The print job data is data of page description language (PDL) such as PS (Post Script (registered trademark)), PCL (Printer Control Language), PDF (Portable Document Format) and XPS (XML Paper Specification), for example. Moreover, the data of print condition may be included in the print job data as a print ticket in a format of PJL (Print Job Language) and the like.

Figure 2:
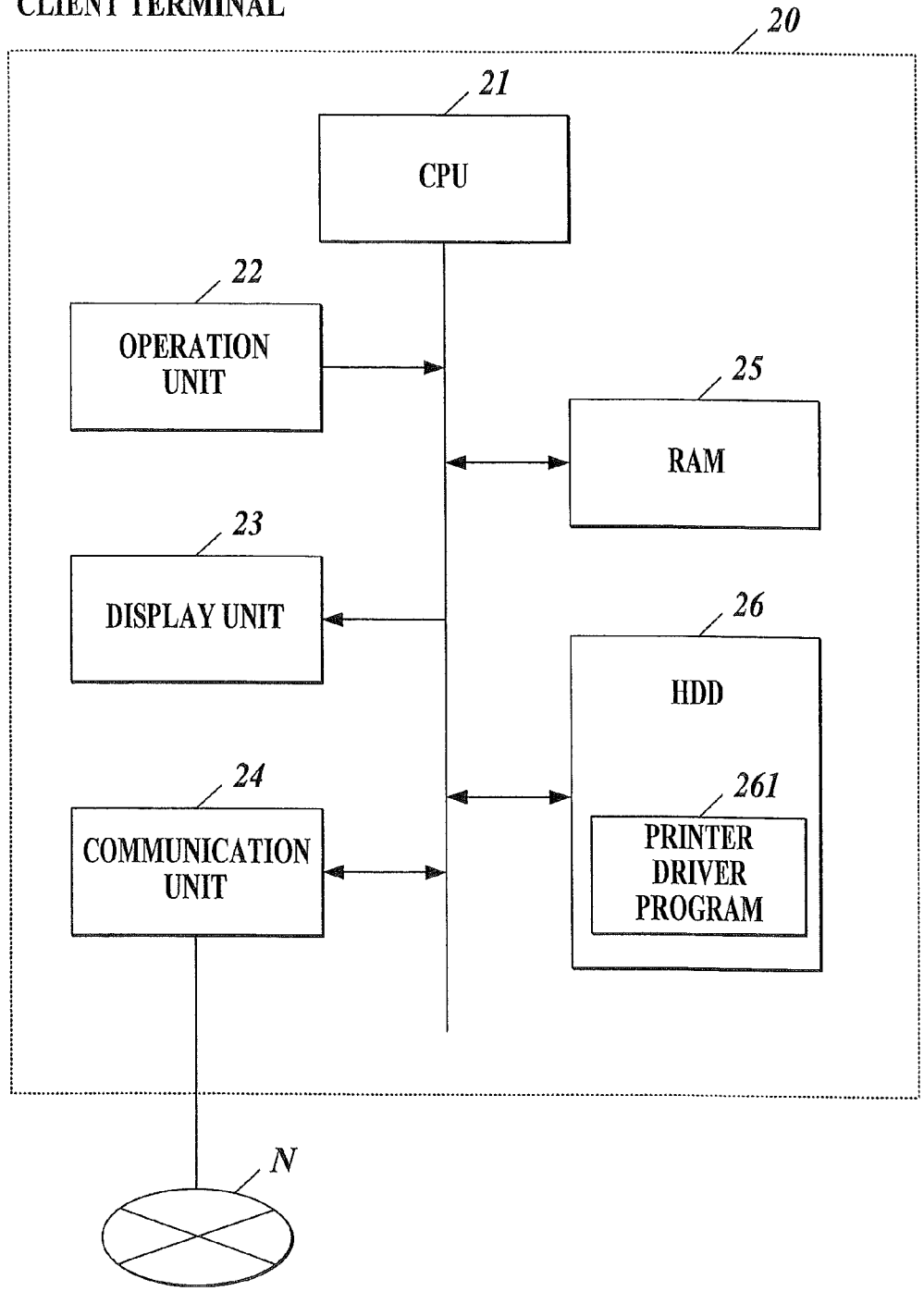
FIG. 2 is a block diagram of a client terminal.

In FIG. 2, a structure of the client terminal 20 is shown. As shown in FIG. 2, the client terminal 20 includes a CPU (Central Processing Unit) 21, an operation unit 22, a display unit 23, a communication unit 24, a RAM (Random Access Memory) 25 and HDD (Hard Dist Drive) 26, for example.

The CPU 21 reads out various types of processing programs which are stored in the HDD 26 according to an operation signal (instruction signal) inputted from the operation unit 22 or an instruction signal received by the communication unit 24, expands the read programs in a work area formed in the RAM 25 and carries out various types of processes by cooperating with the programs.

The operation unit 22 includes a key board provided with cursor keys, numerical input keys, various types of function keys and the like and a pointing device such as a mouse. Further, the operation unit 22 outputs instruction signals which are inputted by key operation to the key board and mouse operation to the CPU 21.

The display unit 23 includes a LCD (Liquid Crystal Display) and the like and displays input instructions from the operation unit 22, data and the like according to an instruction of display signal which is inputted from the CPU 21.

The communication unit 24 includes a LAN adapter, a router, a TA (Terminal Adapter) and the like and carries out sending and receiving of data with an external device such as an image forming apparatus 10 which is connected via the communication network N.

The RAM 25 forms a work area to temporarily store various types of processing programs to be executed by the CPU 21 and data according to the programs.

The HDD 26 is a storage device and stores various types of programs, setting data, image data and the like. Further, the HDD 26 stored a printer driver program 261.

The CPU 21 reads out the printer driver program 261 from the HDD 26 and expands the program in the RAM 25, and the CPU 21 transmits print request data and control data for page print to the image forming apparatus 10 by cooperating with the program.

Figure 3:
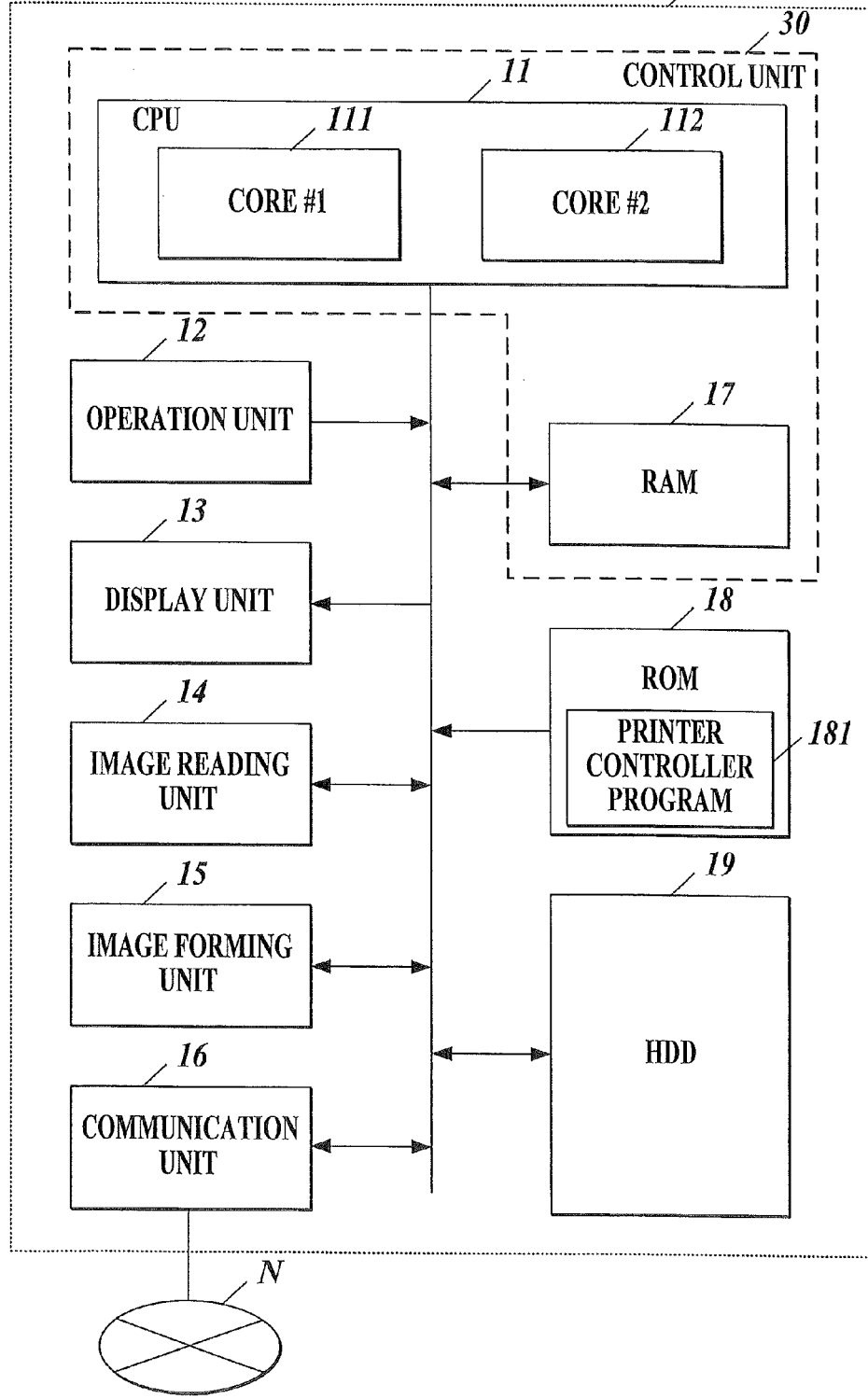
FIG. 3 is a block diagram of an image forming apparatus of the first embodiment.

In FIG. 3, a structure of the image forming device 10 is shown. As shown in FIG. 3, for example, the image forming apparatus 10 includes a CPU (Central Processing Unit) 11, an operation unit 12, a display unit 13, an image reading unit 14, an image forming unit 15, a communication unit 16, a RAM 17, a ROM (Read Only Memory) 18 and a HDD (Hard Disk Drive) 19.

The CPU 11 reads out various types of processing programs stored in the ROM 18 according to an operation signal (instruction signal) inputted from the operation unit 12 or an instruction signal received by the communication unit 16, expands the programs in a work area formed in the RAM 17 and carries out various types of processes by cooperating with the programs. For example, the CPU 11 carries out a series of processes (image forming process) relating to image forming. Hereinafter, the CPU 11 and the RAM 17 are called control unit 30 together in some occasions. The CPU 11 used in the embodiment is a multi-core CPU including a plurality of cores (first core 111 and second core 112) and a plurality of processes can be carried out in parallel by using the multi-core CPU. In the embodiment, a multi-core CPU having two cores is used. However, a CPU or a MPU (Micro Processor Unit) having three or more cores may be used. Further, instead of structuring a plurality of arithmetic processing units by a plurality of cores in the multi-core CPU, a plurality of arithmetic processing units may be structured by two or more CPUs.

The operation unit 12 includes various types of keys such as numerical keys, a start key, a reset key and the like and outputs a pushed signal of the pushed key to the CPU 11. Further, the operation unit 12 includes a touch panel which is formed integrally with the display unit 13 and the operation unit 12 detects a position on the touch panel touched by a finger tip of a user, a touch pen and the like to output the position signal to the CPU 11.

The image reading unit 14 is a so-called scanner for generating image data by reading a document image, and the image reading unit 14 includes a platen glass for placing a document and a scanning optical system for forming an image on a CCD image sensor by scanning the document image on the platen glass. The image reading unit 14 generates an image signal by carrying out A/D conversion to the image signal generated based on the document image read by the CCD image sensor.

The image forming unit 15 is a functional unit including constituents necessary for forming an image by using an imaging process such as an electrographic method, an electrostatic recording method, a thermal transcription method and the like. For example, the image forming unit 15 includes a photoreceptor drum, a transfer belt, a fixing device, various types of conveyance belts, an electronic circuit, a paper feeding unit, a paper ejection unit and the like. Following an instruction of the CPU 11, the image forming unit 15 forms an image on a paper supplied from the paper feeding unit based on the image data which is generated by the image reading unit 14, the print job data which is received by the communication unit 16 or the like and conveys the paper to the paper ejection unit. Further, the paper feeding unit includes a paper feeding tray and the paper ejection unit includes a paper ejection tray.

The communication unit 16 includes a LAN adapter, a router, a TA (terminal adapter) and the like and carries out sending and receiving of data with an external device such as the client terminal 20 and the like which is connected via the communication network N. For example, the communication unit 16 receives the print job data (print request data and control data for page print) from the client terminal 20.

The RAM 17 forms a work area to temporarily storing various types of processing programs which are to be executed by the CPU 11 and data according to the programs. Further, the RAM 17 also stores the control data for page print and the like which are received from the client terminal 20 by the communication unit 16.

The ROM 18 stores various types of processing programs which are to be executed in the CPU 11, various types of data and the like. These various types of programs are stored in a form of readable program codes, and the CPU 11 sequentially executes an operation following the program code. Further, the ROM 18 stores the printer controller program 181, font data and the like.

The HDD 19 is a storage device and stores the image data which is read by the image reading unit 14 and the like. Further, the HDD 19 also stores additional font data and the like.

The control unit 30 reads out the printer controller program 181 from the ROM 18 and expands the program in the RAM 17, and functions as described below by cooperating with the program. That is, the control unit 30 analyzes the control data for page print which is received from the client terminal 20 by the communication unit 16 and generates intermediate language data. Then, the control unit 30 carries out a rasterizing process based on the intermediate language data to generate bitmap data. Further, the control unit 30 outputs the generate bitmap data to the image forming unit 15.

Figure 4:
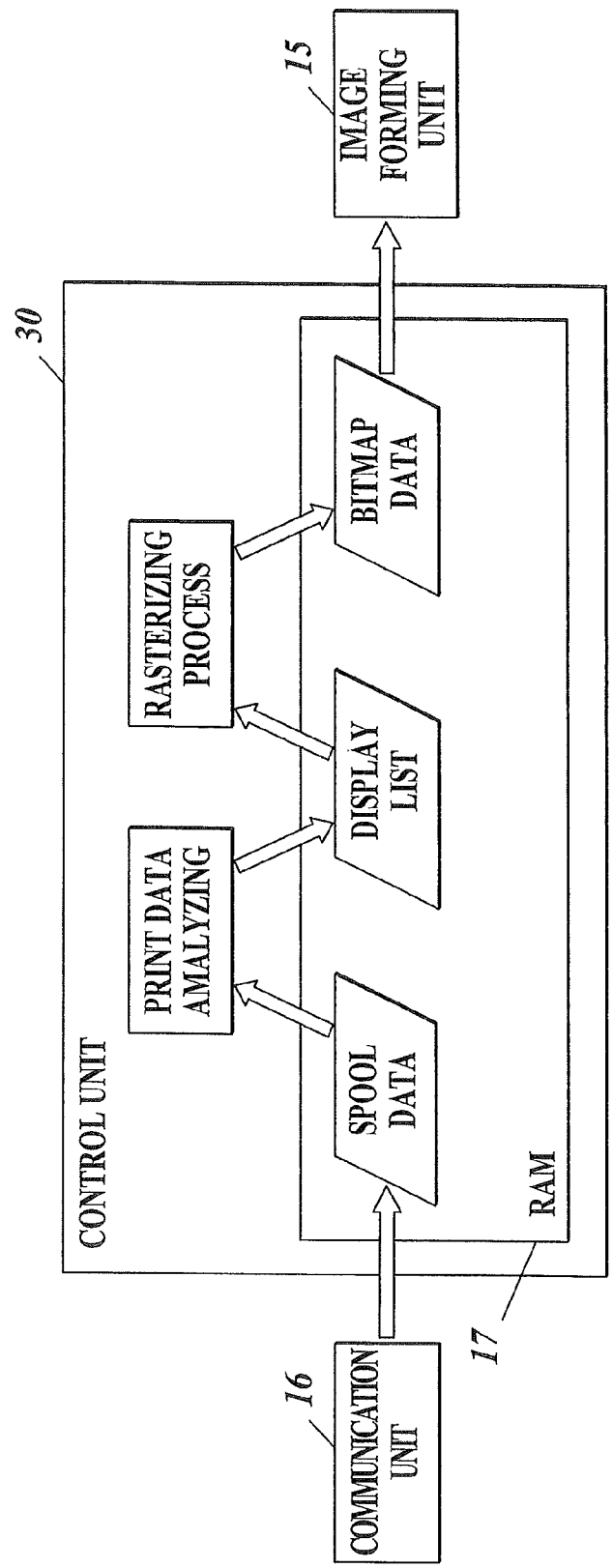
FIG. 4 is a diagram showing a process flow of an image forming process.

The process flow of the image forming process which is carried out by the control unit 30 of the image forming apparatus 10 structured as described above will be described with reference to FIG. 4. In the description, only the control data for page print is focused as the data to be obtained by the control unit 30.

The control unit 30 obtains the control data for page print which is transmitted from the client terminal 20 via the communication unit 16. The control unit 30 temporarily stores (spools) the obtained control data for page print in a spool buffer of the RAM 17 as spool data. The control unit 30 reads out the spool data, that is, the control data for page print, from the spool buffer of the RAM 17. Then, the control unit 30 executes a print data analyzing process, and divides one page in bands of a plurality of lines based on the control data for page print which is read out and generates a display list (intermediate language data) in band unit of the divided bands and then, stores the generated display list in the RAM 17. At this time, as after-mentioned, the control unit 30 calculates the time (rasterizing estimated time) needed for process when rasterizing an object specified by the display list to convert the object into bitmap in band unit and stores the calculated time in the RAM 17. Then, the control unit 30 reads out the display list from the RAM 17 at the time when the display list for one page is completed.

The control unit 30 carries out the rasterizing process based on the read out display list, generates bitmap data which is divided in band unit and sequentially stores the bitmap data in the RAM 17. That is, the control unit 30 carries out the rasterizing process in band unit.

When bitmap data for the first band is completed, the control unit 30 activates the image forming unit 15 to start the print operation and thereafter, the control unit 30 outputs the bitmap data of the first band which is stored in the RAM 17 to the image forming unit 15. On the other hand, the control unit 30 continues to generate bitmap data of the second band and the bands thereafter and continues to store the generated bitmap data in the RAM 17. The image forming unit 15 forms an image on a paper based on the outputted bitmap data. The control unit 30 sequentially outputs the bitmap data in band unit which are stored in the RAM 17 to the image forming unit 15 at every predetermined timing.

Moreover, because the rasterizing time is estimated in advance, the control unit 30 may activate the image forming unit 15 before completion of bitmap data of one band by back calculating the rasterizing time so that image forming based on the bitmap data of the first band is carried out when the activation of the image forming unit 15 is completed. In such way, an overhead due to initializing process such as rotating of a motor carried out before starting of image forming operation is taken up in the rasterizing time and the image forming time can be made short.

Next, what the image forming process which is carried out by the control unit 30 of the image forming apparatus 10 involves in particular will be described by using FIG. 5.

Figure 5:
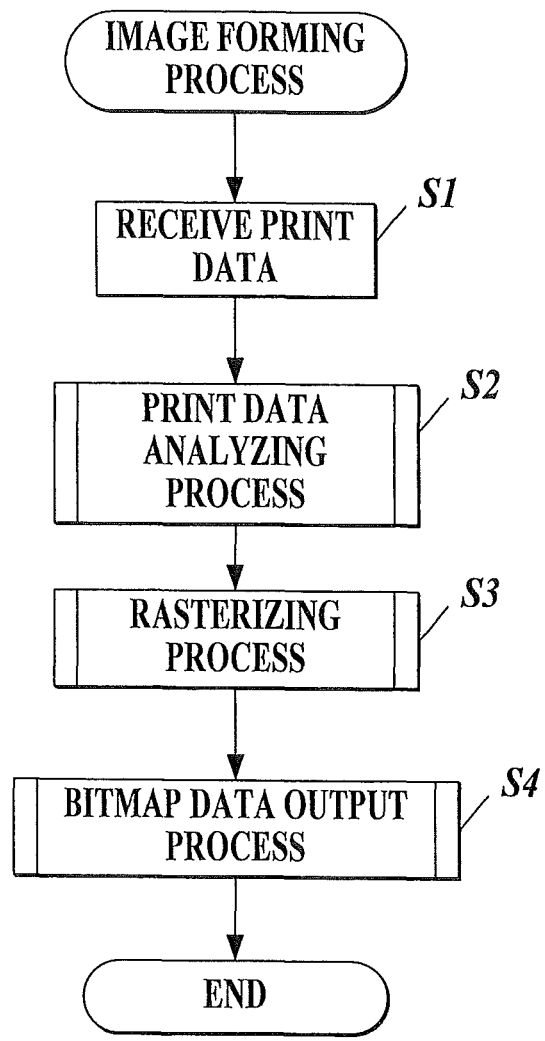
FIG. 5 is a flowchart showing an image forming process.

FIG. 5 is a flowchart showing the image forming process. In the flowchart, only the control data for page print is focused as the data to be received from the client terminal 20 by the image forming apparatus 10.

First, the control unit 30 receives the control data for page print from the client terminal 20 by the communication unit 16 and spools the received data in the RAM 17 (step S1). Then, the control unit 30 reads out the control data for page print which is spooled and carries out the print data analyzing process (step S2). The print data analyzing process is a process to analyze objects included in the control data for page print, to generate a display list (intermediate language data) and to temporarily store the display list in the RAM 17.

Then, when the display list for one page is completed, the control unit 30 reads out the display list from the RAM 17 and carries out the rasterizing process (step S3). The rasterizing process is a process to analyze the objects included in the display list, to generate bitmap data which is divided in band unit and to temporarily store the bitmap data in the RAM 17.

Further, when the bitmap data for one band is completed, the control unit 30 carries out the bitmap data output process to output the bitmap data which is stored in the RAM 17 (step S4). The bitmap data output process is a process to output the bitmap data to the image forming unit 15.

The image forming unit 15 forms an image on a paper based on the outputted bitmap data.

Here, in the description of the embodiment, as for the print data analyzing process, the rasterizing process and the bitmap data output process which are executed by the control unit 30, the description is given so as to follow the procedure which is exemplified for the convenience of describing. However, the processes may be executed in parallel.

Figure 6:
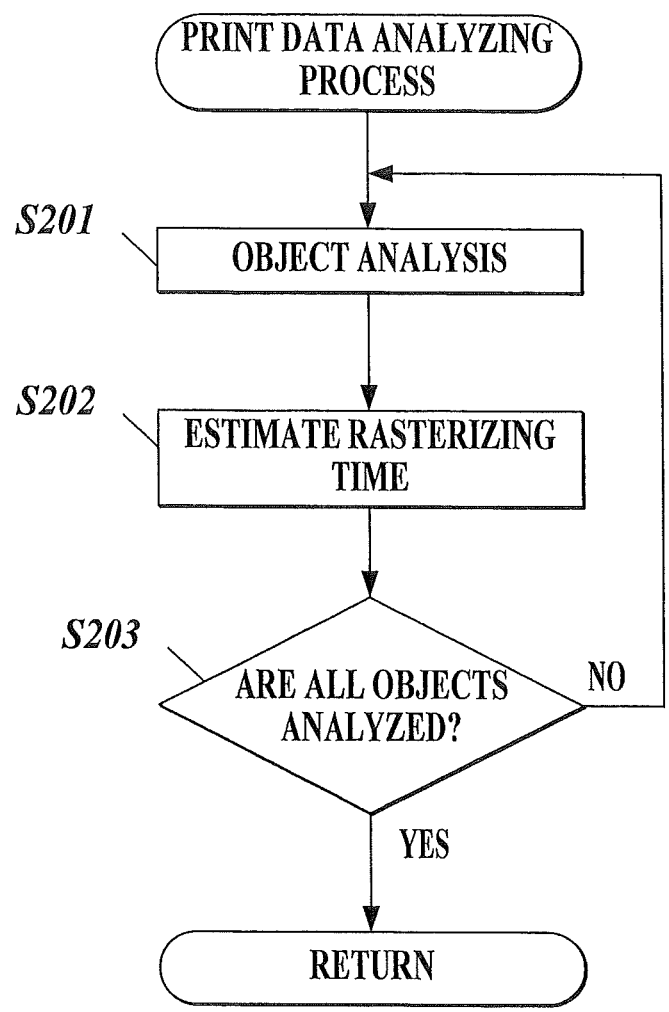
FIG. 6 is a flowchart showing a print data analyzing process.

Next, what the print data analyzing process (step S2 of FIG. 5) involves in particular will be described by using FIG. 6. FIG. 6 is a flowchart showing the print data analyzing process, and this process is to be executed by either of the first core 111 or the second core 112 of the control unit 30.

As shown in FIG. 6, the control unit 30 analyzes the objects included in the control data for page print which is readout from the RAM 17, divide one page in bands of a plurality of lines (for example, 28 lines) and generates a display list (intermediate language data) in band unit (step S201). Then, the control unit 30 temporarily stores the generated display list in the RAM 17.

Further, the control unit 30 calculates rasterizing estimated time based on the display list along with analyzing the object as described above (step S202). In particular, the control unit 30 calculates the rasterizing estimated time based on the type and the area of the object which is stored in the display list. Here, the area of the object is calculated based on the coordinate described in the display list.

The display list includes types such as text data, graphic data, image data in which enlarging process does not occur, image data in which enlarging process occurs, image data in which rotation process occurs, gradation data and the like.

Here, in the ROM 18, a table for calculating rasterizing estimated time in which a rasterizing estimated time per unit area (1000 pixel) is defined for each type of objects is stored as shown in FIG. 12, and the control unit 30 calculates rasterizing estimated time for each object by referring to the table for calculating rasterizing estimated time.

Further, the control unit 30 temporarily stores the estimated rasterizing time in the RAM 17 so as to be corresponded to each object in a form as shown in FIG. 13.

Here, in the calculation of rasterizing estimated time, estimation accuracy of the rasterizing time may be improved by considering a ROP (Raster OPeration) process, a transparency processing and the like in which combining of ground data and pattern data needs to be carried out.

Next, the control unit 30 determines whether analyzing of all of the objects included in the control data for page print for one page is completed or not (step S203). When the control unit 30 determines that analyzing is completed for all of the objects (step S203: Y), the control unit 30 finishes the print data analyzing process. On the other hand, when the control unit 30 does not determine that analyzing is completed for all of the objects (step S203: N), the control unit 30 executes step S201 and carries out analyzing of the next object included in the control data for page print of one page.

Figure 7:
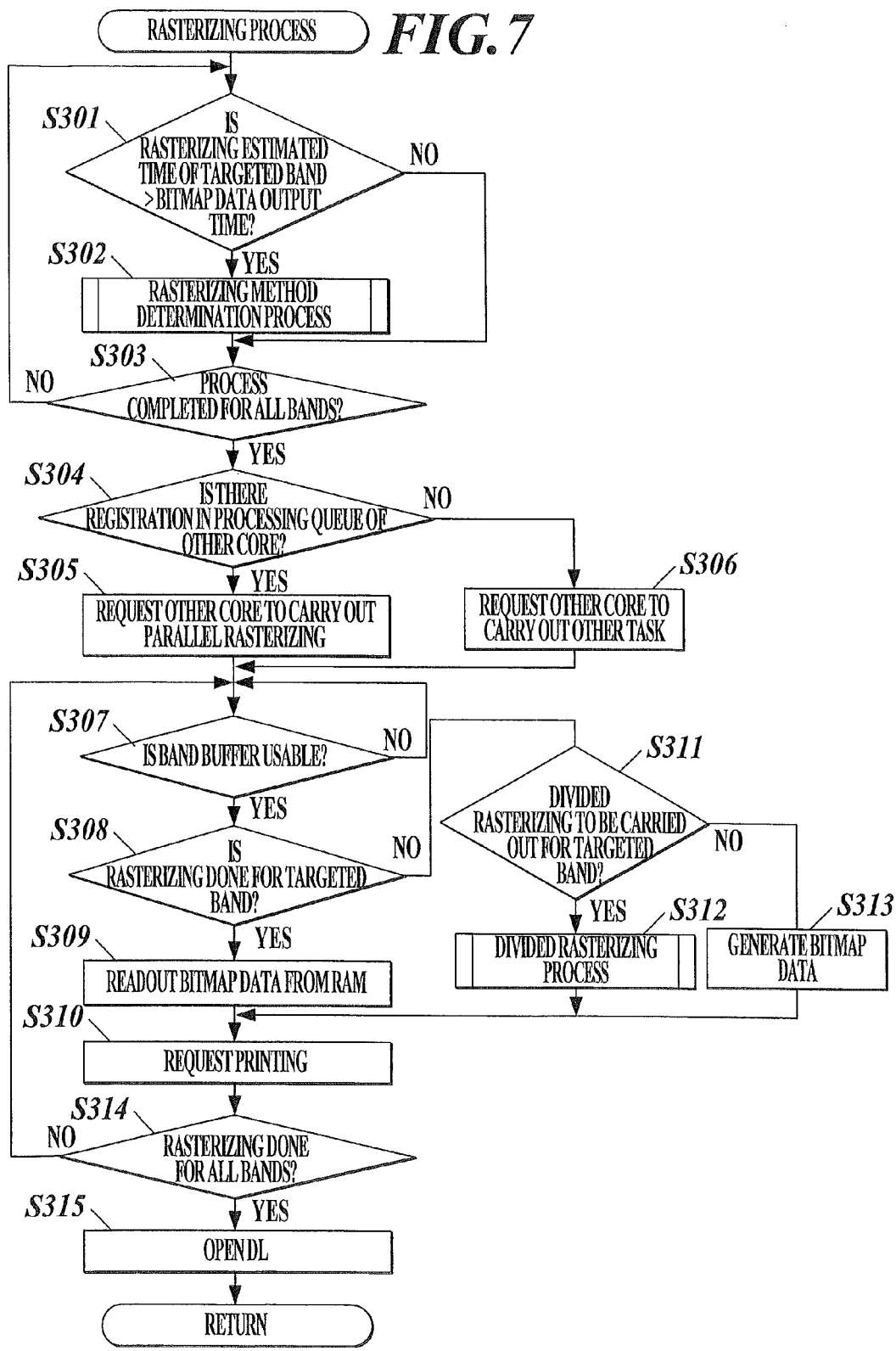
FIG. 7 is a flowchart showing a rasterizing process.

Next, what the rasterizing process (FIG. 5: step S3) which is executed by the control unit 30 activating the first core 111 involves in particular will be described with reference to FIGS. 7 to 9. FIG. 7 is a flowchart showing the rasterizing process. The control unit 30 executes the rasterizing process in band unit, where one page is evenly divided in bands.

First, with respect to a targeted band which is read out, the control unit 30 calculates the rasterizing estimated time of the targeted band based on the rasterizing estimated time for each object which is calculate in the print data analyzing process. Further, the control unit 30 determines whether the calculated rasterizing estimated time of the targeted band is greater than the bitmap data output time, that is, whether the rasterizing is finished within the bitmap data output time (step S301). Here, the bitmap data output time is a time permitted until the bitmap data of the next band is to be outputted after the bitmap data of the band before is outputted when image forming is started by the image forming unit 15 being activated. This time depends on operation speed of the image forming unit 15. When the image forming operation is once started, the image forming unit 15 needs to output the bitmap data in band unit at certain timings according to the operation speed of the image forming unit 15 in order to carry out image forming at a certain operation speed. Therefore, when rasterizing of the band cannot be completed within the bitmap data output time which is an interval of the certain timings, the object in which rasterizing could not be completed will be missing from the printed result. Alternatively, the image forming operation needs to be stopped due to an error such as print overrun.

Here, the operation speed of the image forming unit 15 can vary by paper type, image forming setting and the like. For example, the operation speed of the image forming unit 15 becomes at maximum speed when paper is set to regular paper, and the operation speed becomes slow when paper is set to thick paper, OHP paper and the like because more amount of heat is needed to fix toner. Therefore, the operation speed of the image forming unit 15 is especially subjected to paper type.

When the control unit 30 determines that the rasterizing estimated time of the targeted band is greater than the bitmap data output time (step S301: Y), the control unit 30 executes the after-mentioned rasterizing method determination process (step S302) and thereafter, the process moves to a process of step S303. On the other hand, when the control unit 30 does not determine that the rasterizing estimated time of the targeted band is greater than the bitmap data output time (step S301: N), the process moves to a process of step S303 without carrying out the process of step S302.

Here, the rasterizing method determination process will be described with reference to FIG. 8.

Figure 8:
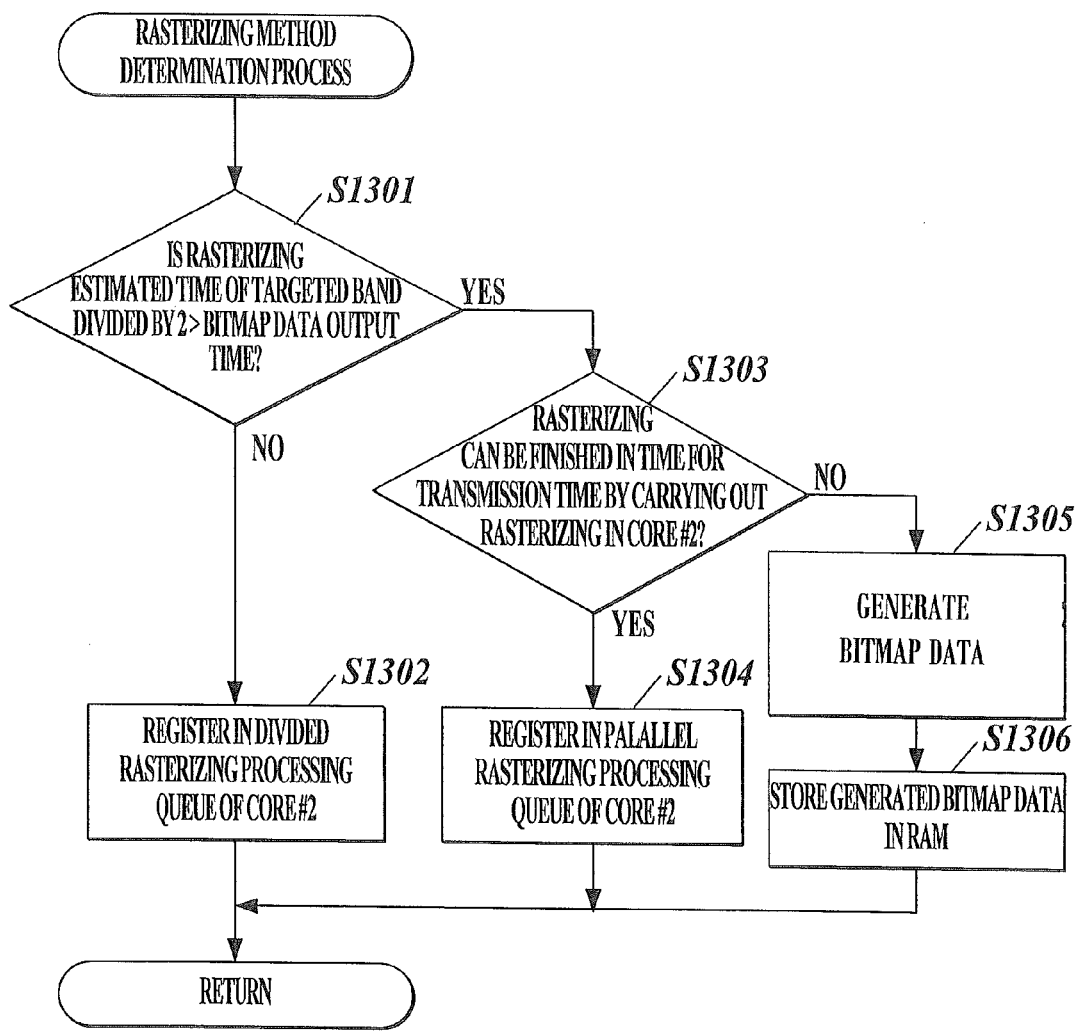
FIG. 8 is a flowchart showing a rasterizing method determination process.

As shown in FIG. 8, the control unit 30 determines whether ½ of the rasterizing estimate time of the targeted band is greater than the bitmap data output time or not (step S1301). That is, the control unit 30 determines whether the rasterizing of the targeted band can be completed within the bitmap data output time or not when the rasterizing is carried out by two cores of the CPU 11.

When the control unit 30 does not determine that ½ of the rasterizing estimated time of the targeted band is greater than the bitmap data output time, that is, when the control unit 30 determines that the rasterizing can be completed within the bitmap data output time when the rasterizing of the targeted band is carried out by two cores (step S1301: N), the targeted band is to be registered in the processing queue of the second core 112 as a band to which divided rasterizing is to be carried out (step S1302). After carrying out the process of step S1302, the control unit 30 finishes the process. Here, the divided rasterizing means to divide one band in two and to rasterize the divided bands in parallel by two cores of the CPU.

Moreover, when the control unit 30 determines that ½ of the rasterizing estimated time of the targeted band is greater than the bitmap data output time in step S1301, that is, when the control unit 30 determines that divided rasterizing cannot be carried out (step s1302: Y), the control unit 30 determines whether the bitmap data can be generated in time for the output timing of bitmap data of the targeted band or not by carrying out parallel rasterizing (step S1303). Here, the parallel rasterizing means to carry out rasterizing of the targeted band in advance in the second core 112 in parallel with the rasterizing process of the band which comes before the targeted band which is carried out by the first core 111 of the two cores of the CPU 11. In other words, the control unit 30 determines whether the bitmap data can be generated in time for the timing of transmitting the bitmap data of the targeted band to the image forming unit 15 or not by generating the bitmap data of the targeted band in advance by carrying out rasterizing of the targeted band in advance in the second core 112 in parallel with the rasterizing carried out in order from the first band in the first core 111. In such case, as the band which is to be targeted for the parallel rasterizing be the later bands in one page, time which can be used for rasterizing increases. Therefore, possibility that the parallel rasterizing being able to be carried out increases.

When the control unit 30 determines that bitmap data can be generated in time for the output timing of the bitmap data of the targeted band when parallel rasterizing is carried out (step S1303: Y), the control unit 30 registers the targeted band in the processing queue of the second core 112 as the band to which parallel rasterizing is to be carried out (step S1304) and finishes the process.

Further, when the control unit 30 determines that bitmap data cannot be generated in time for the output timing of the bitmap data of the targeted band even when parallel rasterizing is carried out (step S1303: N), the control unit 30 carries out a pre-rendering process. That is, the control unit 30 generates bitmap data of the targeted band by carrying out rasterizing (step S1305) and stores the generated bitmap data in the RAM 17 (step S1306). Then, the control unit 30 finishes the process after storing the bitmap data. In such way, when both of divided rasterizing and parallel rasterizing cannot be carried out for the targeted band, the control unit 30 generates bitmap data in advance and stores the generated bitmap data in the RAM 17 to surely output the bitmap data of the targeted band at the timing of outputting the bitmap data to the image forming unit 15.

Returning to FIG. 7, description of the rasterizing process will continue. In step S303, the control unit 30 determines whether a determination process for determining which method of rasterizing is to be carried out for all of the bands in one page are carried out or not (step S303). When the control unit 30 does not determine that the above determination process is carried out for all of the bands (step S303: N), the control unit 30 moves to the process of step S301 and carries out the process to the next band as the targeted band. On the other hand, when the control unit 30 determines that the determination process is carried out for all of the bands (step S303: Y), the control unit 30 finishes the previous processes for rasterizing (steps S301 and S302) and moves to step S304.

As described above, the control unit 30 decides the rasterizing method for each band of one page as a pre-process for rasterizing. By carrying out such process, even when the raterizing estimated time of the targeted band is greater than the bitmap data output time, bitmap data can be surely generated so as to be in time for the output timing of the bitmap data by using a plurality of cores for the rasterizing process. Therefore, print overrun can be prevented. Further, by not carrying out pre-rendering as much as possible, delay in activation time of the image forming unit 15 is inhibited and image forming speed can be improved.

In step S304, whether a band to which parallel rasterizing is to be carried out is registered in a processing queue of other cores (that is, cores other than the first core) or not is determined in the rasterizing method determination process (step S304).

Next, when the control unit 30 determines that a band to which parallel rasterizing is to be carried out is registered (step S304: Y), the control unit 30 requests the other core to carry out rasterizing of the band which is registered in the processing queue so as to carry out rasterizing in parallel in a plurality of cores in the CPU 11 (step S305). On the other hand, when the control unit 30 does not determine that there is a band to which parallel rasterizing is to be carried out (step S304: N), the control unit 30 requests the other core to carry out other tasks other than rasterizing (step S306). Other tasks include the above mentioned print data analyzing process and the like, for example.

Then, the control unit 30 carries out the following process in order to generate bitmap data in order from the first band of the page. That is, after waiting the band buffer which is a region for generating bitmap data to be available (step S307), the control unit 30 moves to a process of step S308. Here, the band buffer is a region in which bitmap data of one band is to be written and temporarily stored, and the band buffer is to be opened when the bitmap data of one band which is stored therein is outputted to the image forming apparatus 15. In the embodiment, there are band buffers for two bands, and while transmitting bitmap data of a band to the image forming apparatus 15 by using one buffer, bitmap data of the next band can be generated by using the other band buffer. Thereby, rasterizing of a band which is to be generated next can be started early. In such way, possibility of the image forming process being delayed due to rasterizing being on stand-by because there is no opening in band buffer is reduced. Further, rasterizing of bands can be carried out more in advance by providing three or more band buffers. In such case, when too many band buffers are provided, memory region to be used increases. Therefore, it is preferred that an optimum number of band buffers are to be provided considering occurrence of memory overflow caused by memory insufficiency in other processes.

Next, whether rasterizing is finished for the targeted band or not is determined (step S308). Here, when the bitmap data of the targeted band is pre-rendered in the rasterizing method determining process or when parallel rasterizing is carried out in the other core as described later, the bitmap data is already stored in the RAM 17 at this point. When the control unit 30 determines that rasterizing is finished for the targeted band (step S308: Y), the control unit 30 reads out the bitmap data which is already generated from the RAM 17 and expands the bitmap data in a band buffer (step S309) and thereafter, the control unit 30 requests the image forming unit 15 to print (step S310). By carrying out the print request, the after-mentioned bitmap data output process is executed.

On the other hand, when the control unit 30 does not determine that rasterizing is finished for the targeted band (step S308: N), the control unit 30 determines whether the targeted band is a band to which divided rasterizing is to be carried out or not (step S311). When the control unit 30 determined that the targeted band is a band to which divided rasterizing is to be carried out (step S311: Y), the control unit 30 executes the divided rasterizing process for carrying out divided rasterizing for the band (step S312) and thereafter, executes a process of step S310. On the other hand, when the control unit 30 does not determine that the targeted band is a band to which divided rasterizing is to be carried out (step S311: N), the control unit 30 generates bitmap data of the band by a regular rasterizing process on a band buffer (step S313) and thereafter, executes the process of step S310.

Here, the divided rasterizing process will be described with reference to FIG. 9.

Figure 9:
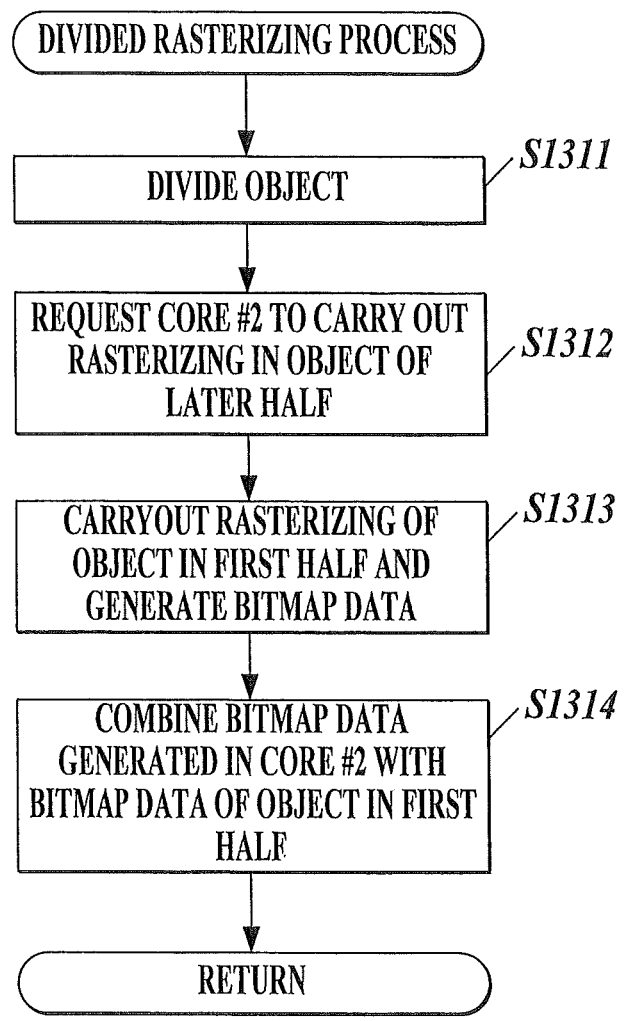
FIG. 9 is a flowchart showing a divided rasterizing process.

As shown in FIG. 9, the control unit 30 divides a plurality of objects that structure the band in two according to a predetermined arrangement order of the objects (step S1311) and requests the second core to carry out rasterizing for the objects which are arranged in later half among the plurality of divided objects (step S1312). Here, the dividing of the plurality of objects can be carried out at other timing. For example, the dividing may be carried out at the timing when it is determined to carry out divided rasterizing.

Then, the control unit 30 generates bitmap data of the objects which are arranged in later half among the plurality of divided objects on a band buffer (step S1313) and overwrites and combines the bitmap data generated in the after-mentioned second core 112 onto the bitmap data generated on the band buffer (step S1314), and thereafter, the control unit 30 finishes the process. In such way, by the control unit 30 requesting the second core 112 to carry out rasterizing before carrying out rasterizing by the first core 111, rasterizing can be carried out in parallel in two cores.

Here, dividing of the objects will be described with reference to FIG. 14.

Figure 14:
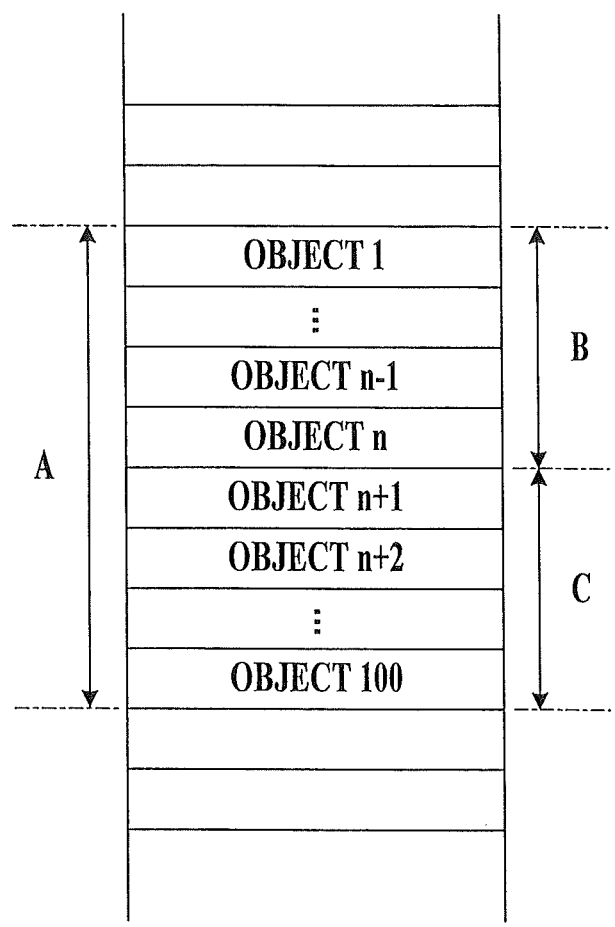
FIG. 14 is a diagram for explaining a structure of a display list.

FIG. 14 schematically shows a storage region of a display list which is structured on the RAM 17. In FIG. 14, A indicates a range where a display list for one band is stored, B indicates a range where objects which are to be rasterized in the first core 111 and C indicates a range where objects which are to be rasterized in the second core 112. Further, the display list of objects is stored in the order of the objects being rasterized. That is, the display list is generated so that the rasterizing order of the objects can be specified.

For example, as shown in FIG. 14, when 100 objects are stored in the band, the control unit 30 allocates first to $n^{th}$ objects (B: a group of objects in first half) to the first core 111 and allocates $n+1^{th}$ to $100^{th}$ objects (C: a group of objects in later half) to the second core 112. That is, the control unit 30 sets between $n^{th}$ object and $n+1^{th}$ object as a dividing position, and the control unit 30 allocates the group of objects in first half and the group of objects in later half specified by the dividing position in tow cores, respectively.

At this time, the number of objects to be allocated to each of the cores is set so that rasterizing time in both cores be equal and so that rasterizing of the band can be executed at fastest rate by carrying out rasterizing at the same time in both cores. Therefore, the control unit 30 divides the objects so that total time of the rasterizing estimated time of the objects which are allocated in each of the cores be equal based on the rasterizing estimated time of each object which is estimated in the print data analyzing process.

Here, the total rasterizing estimated times of the objects which are allocated in each core being equal includes a case where the difference of the total rasterizing estimated times of the cores is minimum when the plurality of objects are divided other than a case where the total rasterizing estimated times of the cores are completely the same.

Here, when the plurality of objects are to be divided, there is a case where rasterizing cannot be carried out by cutting two or more objects apart because of the above mentioned ROP processing, the transparency processing and the like in which two or more objects are to be processed at the same time. In such case, the objects are to be divided in a way that the above mentioned objects are not to be cut apart and so that the rasterizing estimated times of both cores be equal.

Further, bitmap data which is to be generated by the divided rasterizing process will be described by using FIG. 15.

The control unit 30 divides the plurality of objects which are constituted in one band as described above in the objects of first half and the objects of later half.

Figure 15A:
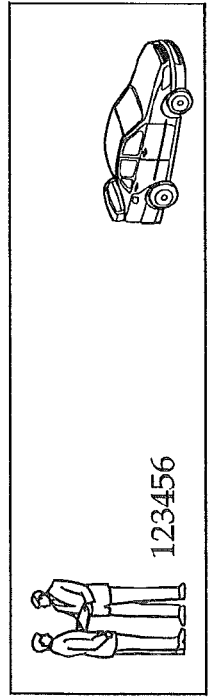
FIG. 15A is a diagram for explaining generation process of bitmap data by a divided rasterizing.
Figure 15C:
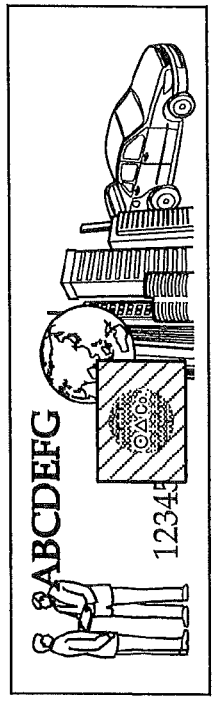
FIG. 15C is a diagram for explaining the generation process of bitmap data by the divided rasterizing.
Figure 15B:
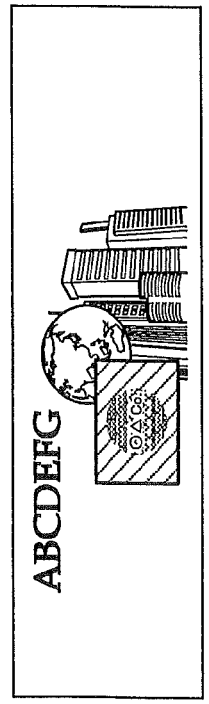
FIG. 15B is a diagram for explaining the generation process of bitmap data by the divided rasterizing.

Then, the control unit 30 makes the first core 111 rasterize the objects in first half and generates bitmap data of first half as shown in FIG. 15A on a band buffer, and the control unit 30 makes the second core 112 rasterize the objects in later half and generates bitmap data of later half as shown in FIG. 15B in a predetermined work area.

Then, the control unit 30 overwrites and combines the bitmap data of later half onto the bitmap data of first half and generates bitmap data as shown in FIG. 15C.

Returning to FIG. 7, description of the rasterizing process will be continued. In step S314, the control unit 30 determines whether the rasterizing process is completed for all of the bands in a page which is targeted for the rasterizing process or not (step S314). When the control unit 30 determines that the rasterizing process is completed for all of the bands (step S314: Y), the control unit 30 opens the storage region of the RAM 17 in which the display list of the page has been stored (step S315) and finishes the process. On the other hand, when the control unit 30 does not determine that the rasterizing process is completed for all of the bands (step S314: N), the control unit 30 executes a process of step S307 and waits for the band buffer to be available and carries out the rasterizing process to the next band as the targeted band.

Figure 10:
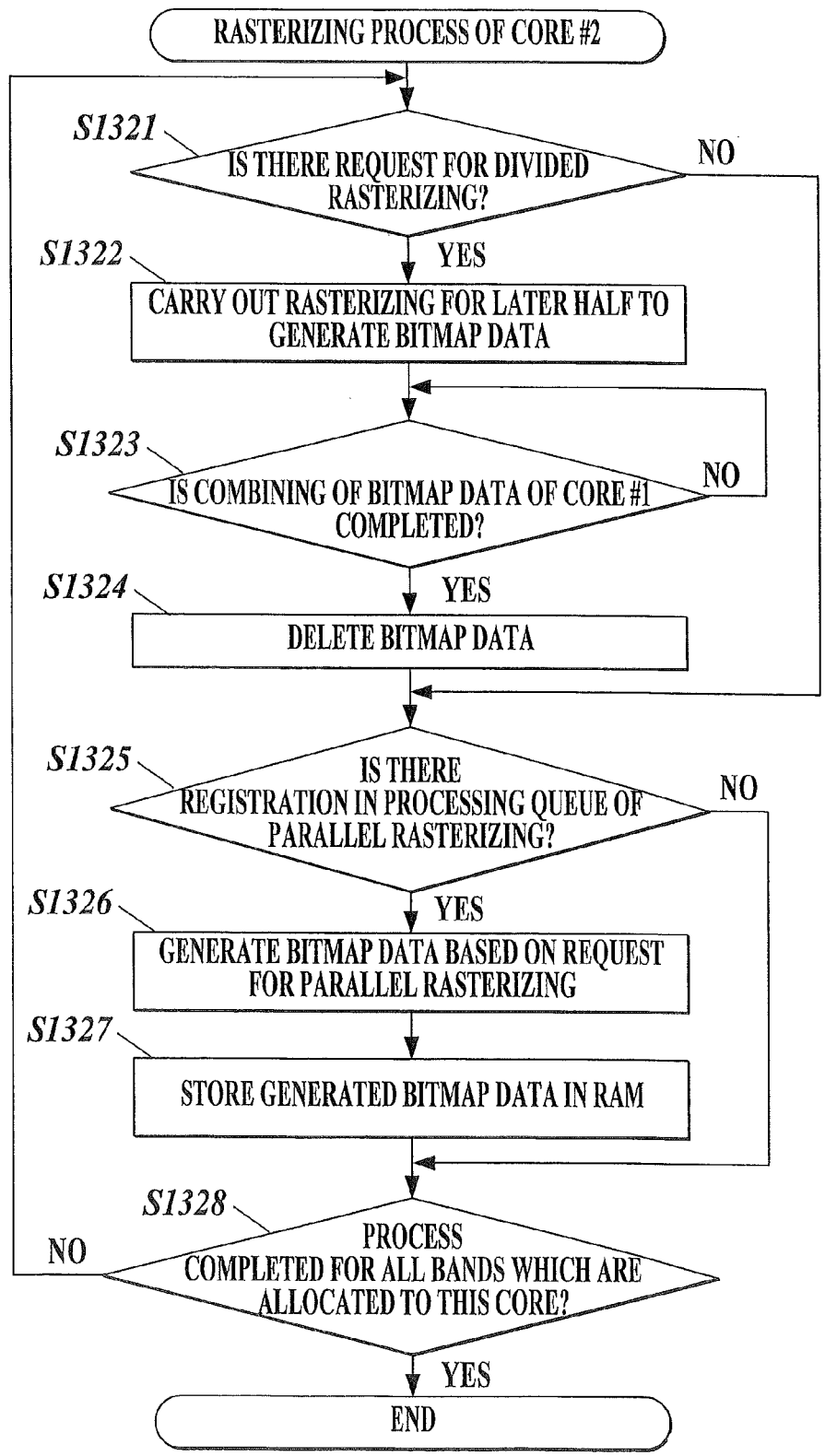
FIG. 10 is a flowchart showing a rasterizing process of core #2.

Next, what the rasterizing process of core #2 which is executed by the control unit 30 driving the second core 112 involves in particular will be described by using FIG. 10. FIG. 10 is a flowchart showing the rasterizing process of core #2. The rasterizing process of core #2 is a process to be executed when rasterizing is requested from the first core 111. Here, the process which is executed by the second core 112 being driven can be carried out at the same time in parallel with the process which is executed by the first core 111 being driven. Further, after the rasterizing process which is allocated to the second core 112 is completed or when there is no band to which rasterizing process is to be carried out is allocated to the second core 112, the second core 112 executes the print data analyzing process to carry out analyzing and the like of the control data for page print of the next page and the pages thereafter as long as divided rasterizing is not requested by the first core 111. In such way, printing speed of the job as a whole can be improved and productivity can be enhanced.

First, the control unit 30 determines whether divided rasterizing of the band is requested from the first core 111 or not (step S1321). When the control unit 30 determines that divided rasterizing is requested (step S1321: Y), the control unit 30 carries out rasterizing of the objects in later half of the band, which is the band requested so that divided rasterizing is to be carried out, and generates bitmap data on a predetermined work area in the RAM 17 (step S1322). Here, storing region of the work area in which the bitmap data is to be temporarily stored may be determined in advance or may be changed according to the control state. Then, the control unit 30 waits for the bitmap data of the objects of later half to be combined with the bitmap data which is generated based on the objects in first half of the band in the first core 111, which is executed in the divided rasterizing process (step S1323), and the control unit 30 deletes the bitmap data on the work area which is generated based on the objects in later half (step S1324). On the other hand, when the control unit 30 does not determine that the divided rasterizing is requested in step S1321 (step S1321: N), that is, when divided rasterizing is not requested or when divided rasterizing is already carried out, the control unit 30 moves to a process of step S1325 without executing the processes of steps S1322 to S1324.

Then, the control unit 30 determines whether there is a band registered in the parallel rasterizing processing queue in the above described rasterizing method determination process or not (step S1325). That is, the control unit 30 determines whether there is a band which is made to be a target for parallel rasterizing or not or whether there is a band which is not yet processed to which parallel rasterizing is to be carried out or not. When the control unit 30 determines that there is a band registered in the parallel rasterizing processing queue (step S1325: Y), the control unit 30 carried out rasterizing for the band which is allocated to the second core 112 as a band to which parallel rasterizing is to be carried out and generates bitmap data (step S1326). Then, the control unit 30 stores the generated bitmap data in the RAM 17 to output the bitmap data to the image forming unit 15 later (step S1327) and executes a process of step S1328. On the other hand, when the control unit 30 does not determine that there is a band registered in the parallel rasterizing processing queue in step S1325 (step S1325: N), the control unit 30 moves to a process of step S1328 without executing the processes of step S1326 and step S1327.

Further, the control unit 30 determines whether the rasterizing process is completed for all of the bands allocated to the second core 112 or not (step S1328). When the control unit 30 determines that the rasterizing process is completed for all of the allocated bands (step S1328: Y), the control unit 30 finishes the process. On the other hand, when the control unit 30 does not determine that the rasterizing process is completed for all of the requested bands (step S1328: N), the control unit 30 moves to a process of step S1321 and carries out the rasterizing process for unprocessed bands.

As described above, rasterizing of the bands which are requested to be rasterized in the second core 112 is carried out. Here, when divided rasterizing is requested while parallel rasterizing is being carried out in the second core 112, the divided rasterizing may be carried out in priority to the parallel rasterizing by interrupting the parallel rasterizing operation.

Figure 11:
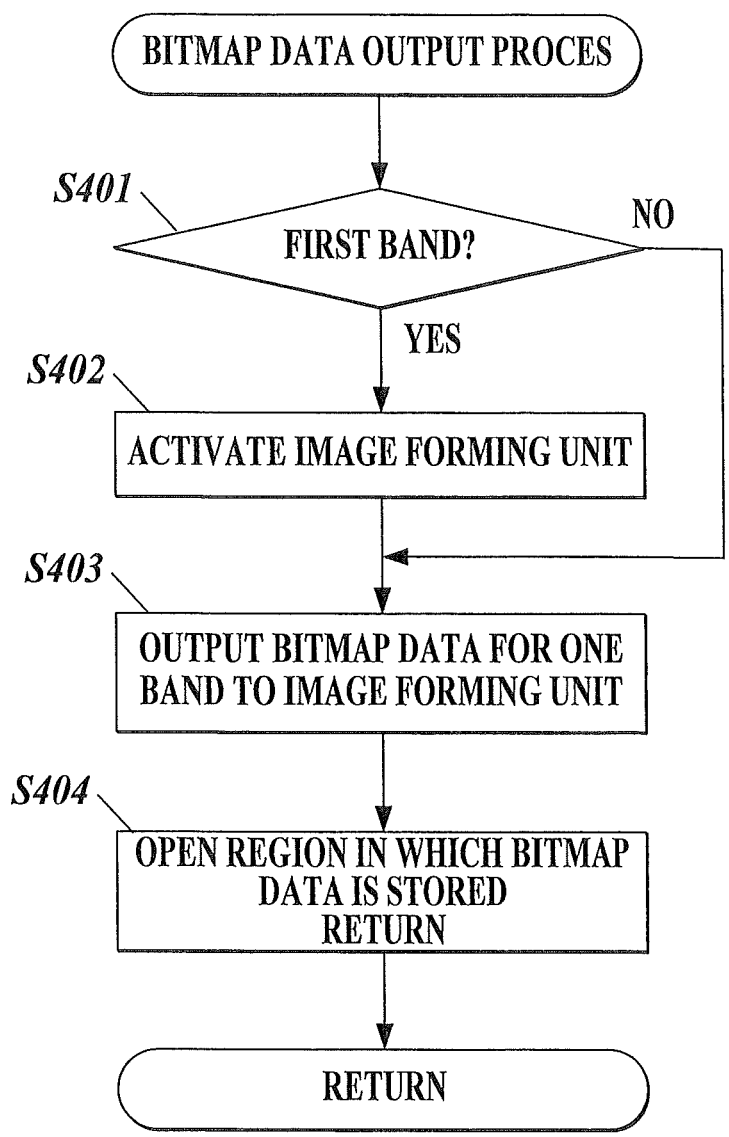
FIG. 11 is a flowchart showing a bitmap data output process.

Next, what the bitmap data output process (step S4 of FIG. 5) involves in particular will be described by using FIG. 11. FIG. 11 is a flowchart showing the bitmap data output process. The bitmap data output process is a process to be executed upon the print request (step S310) carried out in the rasterizing process shown in FIG. 7. That is, the bitmap data output process is a process which is to be executed every time when bitmap data is generated in band unit.

First, the control unit 30 determines whether bitmap data of the first band is to be outputted to the image forming unit 15 or not (step S401). When the control unit 30 determines that the bitmap data of the first band is to be outputted to the image forming unit 15 (step S401: Y), the control unit 30 activates the image forming unit 15 to rotate a photoreceptor drum, to drive a scanning unit such as a polygon mirror or the like that carries out scanning of the photoreceptor drum, to heat a fixing unit, to convey a paper and the like (step S402), and the control unit 30 moves the a process of step S403. On the other hand, when the control unit 30 does not determine that the bitmap data of the first band is to be outputted to the image forming unit 15, that is, when bitmap data of the second band or the bands thereafter is to be outputted to the image forming unit 15 (step S401: N), the control unit moves to the process of step S403 without executing the process of step S402.

Next, the control unit 30 reads out bitmap data for one band from the band buffer of the RAM 17 and outputs the bitmap data to the image forming unit 15 (step S403).

Then, when outputting of the bitmap data to the image forming unit 15 is completed, the control unit 30 deletes the bitmap data of the band stored in the band buffer of the RAM 17 and opens the region in which the bitmap data has been stored (step S404) and then, the control unit 30 finishes the process.

The processing operation of the CPU from when the control unit 30 receives the control data for page print to when the control unit 30 outputs the bitmap data to the image forming unit 15 in the image processing apparatus 10 structured as described above will be described by using FIGS. 16 to 18.

Figure 16:
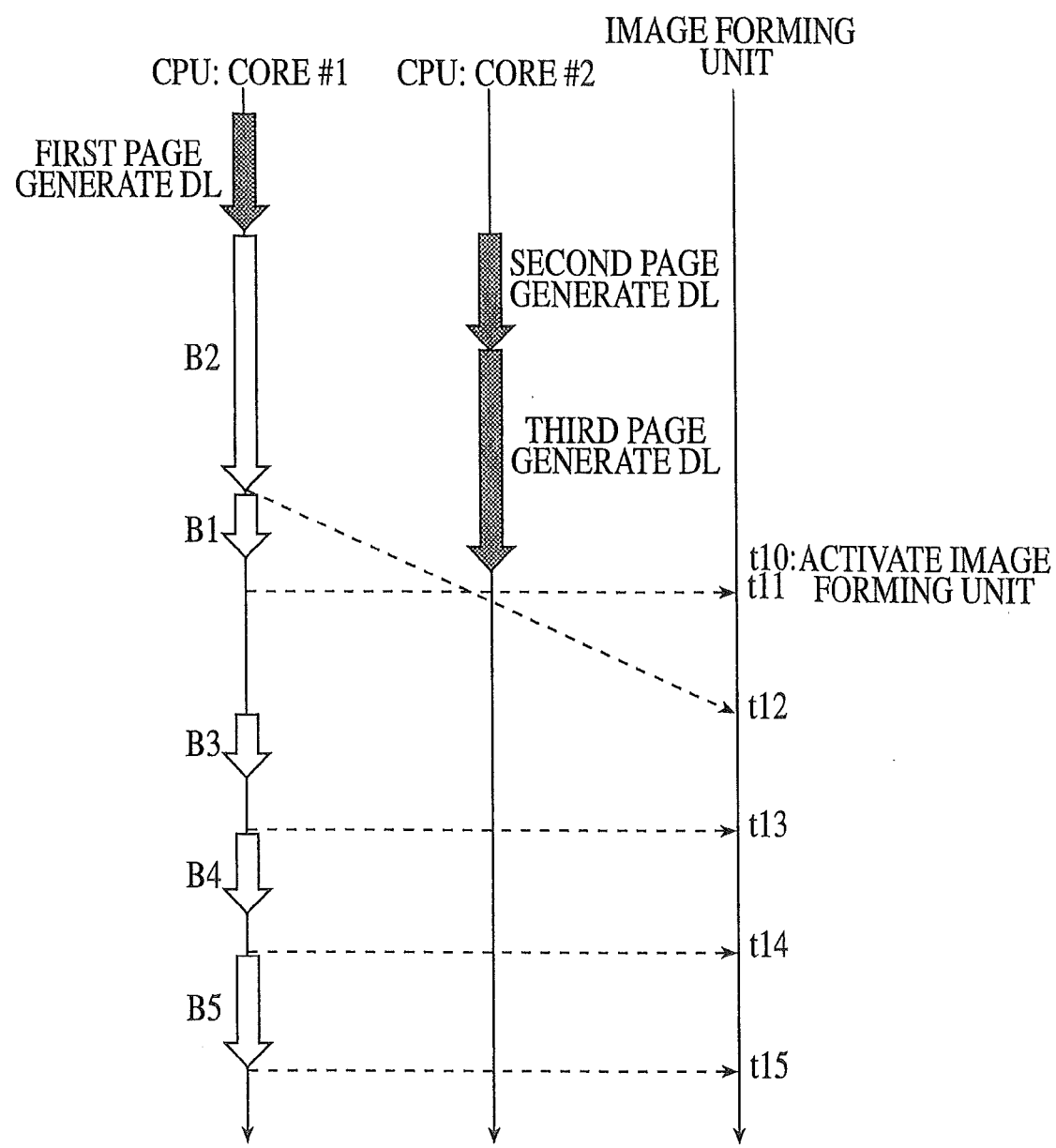
FIG. 16 is a diagram for explaining a processing operation of each core.
Figure 17:
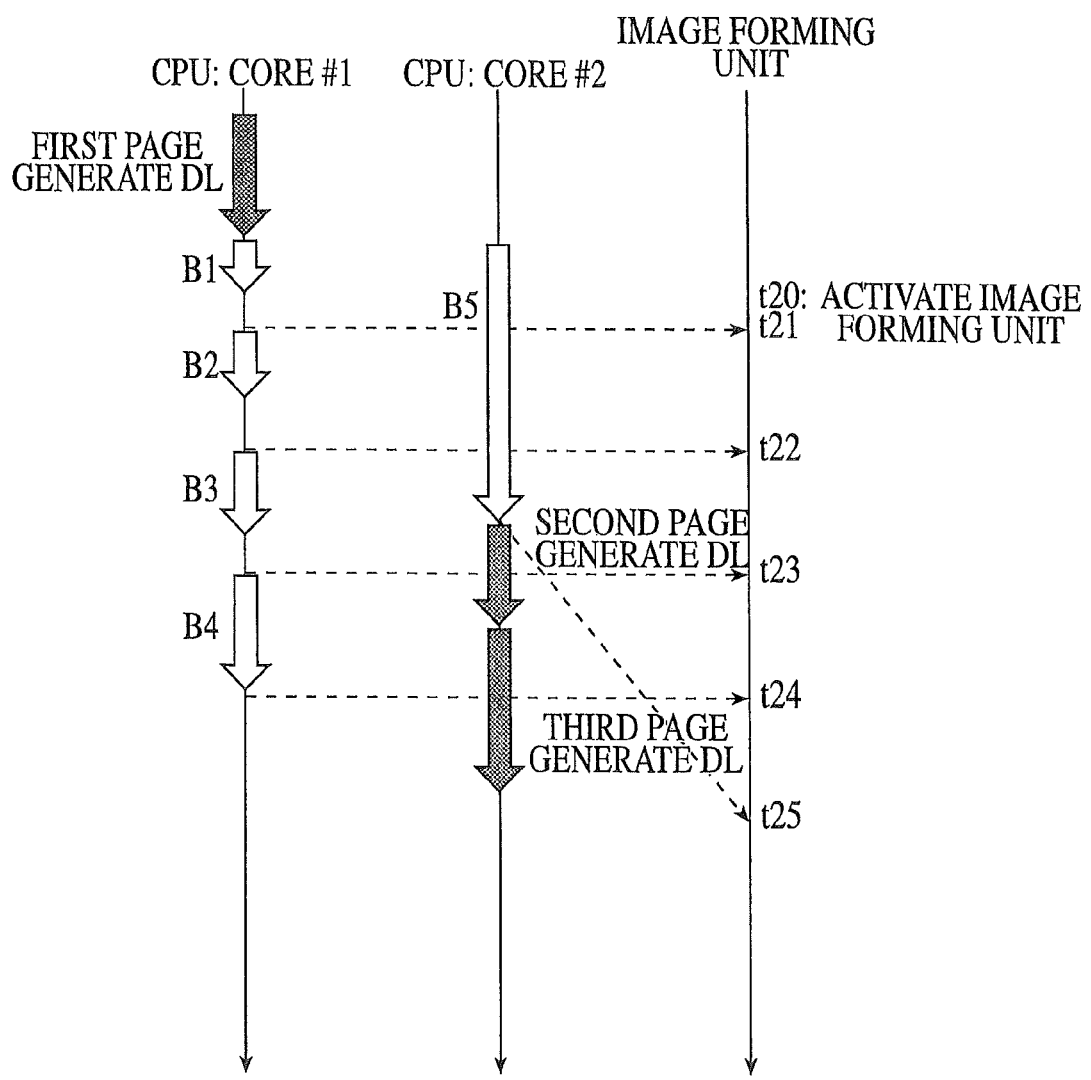
FIG. 17 is a diagram for explaining a processing operation of each core.
Figure 18:
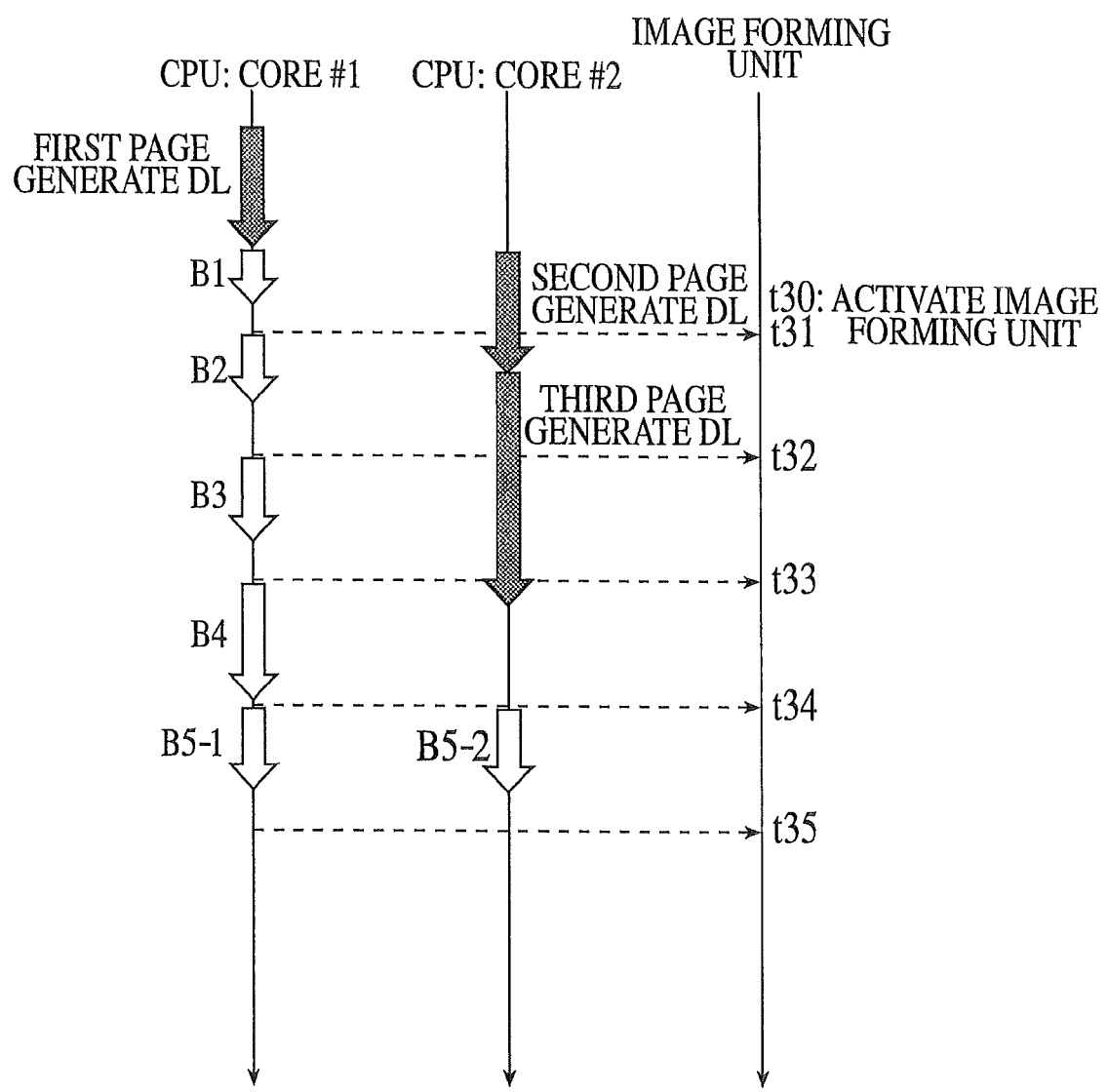
FIG. 18 is a diagram for explaining a processing operation of each core.

Here, in FIGS. 16 to 18, black arrows express that a display list of each page is being created and lengths of the black arrows express the creating time. Further, white arrows express that bitmap data for each band is being generated and lengths of the white arrows express the generating time. Furthermore, in FIGS. 16 to 18, description will be given by using the first band to the fifth band. However, a similar process is to be carried out for the sixth band and the bands thereafter.

FIG. 16 shows an operation of a case in which half of the rasterizing estimated time of the second band B2 is greater than the bitmap data output time and the bitmap data cannot be outputted to the image forming unit 15 in time even when parallel rasterizing is carried out by using the second core 112.

As shown in FIG. 16, the control unit 30 creates a display list for the first page in the first core 111 of the CPU 11 and also divides the page in a plurality of bands and calculates rasterizing estimated time of each object in band unit and stores them in the RAM 17. Next, the control unit 30 calculates the rasterizing estimated time of each band based on the rasterizing estimated time of each object, and the control unit 30 determines the relation between the rasterizing estimated time of each band and the bitmap data output time.

All of the first band B1 and the third band B3 to the fifth band B5 are determined that the rasterizing estimated time is equal to or less than the bitmap data output time, and the control unit 30 is to sequentially carry out rasterizing and outputting of bitmap data to the image forming unit 15 for each band (FIG. 7: step S301: N). Here, t11 to t15 are timings for outputting bitmap data to the image forming unit 15, and intervals between the timings of t11 to t15 are bitmap data output times, the intervals being equal to each other. On the other hand, as for the second band B2, the control unit determines that half of the rasterizing estimated time is greater than the bitmap data output time and that the bitmap data cannot be outputted to the image forming unit 15 in time even when parallel rasterizing is carries out in the second core 112 for the band, and the control unit 30 executed pre-rendering (FIG. 8: step S1305 to S1306).

Because there is no band which is a target for divided rasterizing and parallel rasterizing, the control unit 30 sequentially creates display lists of the second page and the third page in the second core 112 and stores the created display lists in the RAM 17 (FIG. 7: step S306).

The control unit 30 executes rasterizing of the band B1 by the first core 111 (FIG. 7: step S313) and request the image forming unit 15 to print at the timing of t10 when the bitmap data of the band B1 is generated (FIG. 7: step S310), and the control unit 30 activates the image forming unit 15 (FIG. 11: step S402).

Next, the control unit 30 outputs the bitmap data of the band B1 to the image forming unit 15 at the timing of t11 (FIG. 11: step S403). Thereafter, the control unit 30 reads out the bitmap data of the band B2 which is generated in advance by pre-rendering from the RAM 17 and stored the bitmap data in the band buffer (FIG. 7: step S309).

Further, at the timing of t12, the control unit 30 outputs the bitmap data of the band B2 which is stored in the band buffer to the image forming unit 15 (FIG. 11: step S403). On the other hand, when the band buffer which is used for generating the bitmap data of the band B1 is opened (FIG. 11: step S404), the control unit 30 starts rasterizing of the band B3 by the first core 111 (FIG. 7: step S313).

Thereafter, the control unit 30 outputs the bitmap data of the band B3 to the image forming unit 15 at the timing of t13. Hereinafter, similar process is carried out for the band B4 and the bands thereafter.

As described above, in a case when bitmap data cannot be outputted to the image forming unit 15 in time because the rasterizing estimated time of a part of bands among the plurality of bands that structures one page is greater than the bitmap data output time, by carrying out rasterizing in advance for the bands in which the bitmap data cannot be outputted in time by carrying out pre-rendering, occurrence of print overrun and be inhibited. Further, only in a case when there is a band in which bitmap data cannot be outputted to the image forming unit 15 in time even when regular rasterizing, divided rasterizing or parallel rasterizing is carried out, decrease in image forming speed due to starting of operation of the image forming unit 15 being delayed can be inhibited to the minimum decrease by carrying out pre-rendering for the band.

FIG. 17 shows an operation in a case where half of rasterizing estimated time of the fifth band B5 is greater than the bitmap data output time, however, transmitting of bitmap data to the image forming unit 15 can be carried out when parallel rasterizing is carried out by using the second core 112.

As shown in FIG. 17, the control unit 30 creates a display list of the first page by the first core 111 of the CPU 11, and also divides the page in a plurality of bands and calculates the rasterizing estimate time of each object in band unit and stores in the RAM 17. Next, the control unit 30 calculates rasterizing estimate time of each band based on the rasterizing estimated time of each object and determines the relation between the rasterizing estimated time of each band and the bitmap data output time.

All of the first band B1 to the fourth band B4 are determined that the rasterizing estimated time is equal to or less than the bitmap data output time, and the control unit 30 sequentially carries out rasterizing and outputting of bitmap data to the image forming unit 15 of each band (FIG. 7: step S301: N). Here, intervals between the timings t21 to t25 are equal to each other. On the other hand, as for the fifth band B5, the control unit 30 determines that half of the rasterizing estimated time is greater than the bitmap data output time, however, bitmap data can be outputted to the image forming unit 15 in time when parallel rasterizing is carried out for the band by the second core 112, and the control unit 30 registers the band B5 as the band to which parallel rasterizing is to be carried out (FIG. 8: step S1304).

Because a band which is targeted for parallel rasterizing is registered, the control unit 30 requests the second core 112 to rasterize the band B5 (FIG. 7: step S305). By receiving this request, the second core 112 executes rasterizing of the band B5 (FIG. 10: step S1326).

On the other hand, in parallel with the parallel rasterizing by the second core 112, the control unit 30 executes rasterizing of the band B1 by the first core 111 (FIG. 7: step S313), and the control unit 30 requests the image forming unit 15 to print at the timing of t20 when the bitmap data of the band B1 is generated (FIG. 7: step S310) and activates the image forming unit 15 (FIG. 11: step S309).

The control unit 30 outputs the bitmap data of the band B1 to the image forming unit 15 at the timing of t21 (FIG. 11: step S403) and also starts rasterizing of the band B2 by the first core 111 (FIG. 7: step S313).

At the timing of t22, the control unit 30 outputs the bitmap data of the band B2 to the image forming unit 15. Hereinafter, a similar process is carried out for the band B3 and the band B4.

On the other hand, after t22 is passed and when rasterizing of the band B5 by the second core 112 is completed and bitmap data is generated, the control unit 30 stores the generated bitmap data in the RAM 17 (FIG. 10: step S1327). Thereafter, because there is not band which is targeted for divided rasterizing or parallel rasterizing, the control unit 30 makes the second core 112 create display lists of the second page and the third page sequentially and stores the display lists in the RAM 17.

Then, after the bitmap data of the band B4 is outputted to the image forming unit 15 at the timing of t24, the control unit 30 reads out the bitmap data of the band B5 generated in advance by parallel rasterizing, which is stored in the RAM 17, from the RAM 17 and stores the bitmap data in the band buffer (FIG. 7: step S309).

Thereafter, at the timing of t25, the control unit 30 outputs the bitmap data of the band B5 stored in the band buffer to the image forming unit 15 (FIG. 11: step S403).

As described above, in a case when the rasterizing estimated time of one band is greater than the bitmap data output time, however, bitmap data can be outputted to the image forming unit 15 in time by carrying out rasterizing in advance in the second core 112 in parallel with the rasterizing process in the first core 111, by carrying out rasterizing in advance for the band by making the second core 112 carry out parallel rasterizing, the image forming unit 15 can be activated earlier comparing to the case when pre-rendering is carried out. Therefore, image forming can be speeded up.

FIG. 18 shows an operation in a case when the rasterizing estimated time of the fifth band B5 is greater than the bitmap data output time, however, half of the rasterizing estimated time is equal to or less than the bitmap data output time.

As shown in FIG. 18, the control unit 30 creates a display list of the first page by the first core 111 of the CPU 11, and also divides the page in a plurality of bands and calculates the rasterizing estimate time of each object in band unit and stores in the RAM 17. Next, the control unit 30 calculates the rasterizing estimated time for each band based on the rasterizing estimated time of each object and determines the relation between the rasterizing estimated time of each band and the bitmap data output time.

All of the first band B1 to the fourth band B4 are determined that the rasterizing estimated time is equal to or less than the bitmap data output time, and the control unit 30 sequentially carries out rasterizing and outputting of bitmap data to the image forming unit 15 of each band (FIG. 7: step S301: N). Here, intervals between the timings t31 to t35 are equal to each other. On the other hand, as for the fifth band B5, the control unit 30 determines that the rasterizing estimated time is greater than the bitmap data output time, however, half of the rasterizing estimated time is equal to or less than the bitmap data output time, and the control unit 30 registers the band B5 as the band to which divided rasterizing is to be carried out (FIG. 8: step S1302).

Because there is no band which is targeted for parallel rasterizing, the control unit 30 makes the second core 112 sequentially create display lists of the second page and the third page and store the display lists in the RAM 17 until divided rasterizing is requested (FIG. 7: step S306).

Then, the control unit 30 executes rasterizing of the band B1 by the first core 111 (FIG. 7: step S313), and requests the image forming unit 15 to print at the timing of t30 when the bitmap data of the band B1 is generated (FIG. 7: step S310) and activates the image forming unit 15 (FIG. 11: step S402).

Next, the control unit 30 outputs the bitmap data of the band B1 to the image forming unit 15 at the timing of t31 (FIG. 11: step S403) and also starts rasterizing of the band B2 by the first core 111 (FIG. 7: step S313).

Thereafter, the control unit 30 outputs the bitmap data of the band B2 to the image forming unit 15 at the timing of t32. Hereinafter, a similar process is carried out for the band B3 and the band B4.

Then, when the control unit 30 outputs the bitmap data of the band B4 to the image forming unit 15 at the timing of t32, because the band B5 is registered as the band to which divided rasterizing is to be carried out, the control unit 30 divides the plurality of objects that structure the band in two (FIG. 9: step S1311). Then, the control unit 30 requests the second core 112 to rasterize the objects in later half among the objects divided in two (FIG. 9: step S1312). With this request, the second core 112 executes rasterizing of the objects in later half of the band B5 (FIG. 10: step S1322). Then, the control unit 30 makes the first core 111 rasterize the objects in first half among the objects divided in two to generate bitmap data of the first half (FIG. 9: step S1313). Thereafter, after the control unit 30 combines the bitmap data of later half with the bitmap data of first half (FIG. 9: step S13124), the control unit 30 outputs the combined bitmap data of the band B5 to the image forming unit 15 at the timing of t35.

As described above, in the case when the rasterizing estimated time of one band is greater than the bitmap data output time, however, half of the rasterizing estimated time is equal to or less than the bitmap data output time, process efficiency can be enhanced in such way that the second core 112 can be made to carry out great amount of analyzing process of print data and the like and the image forming can be carried out even more speedy comparing to the case when the objects structuring the band are divided in two and when parallel rasterizing is carried out by making two cores respectively rasterize each of the two groups of objects at the same time.

(Second Embodiment)

Figure 19:
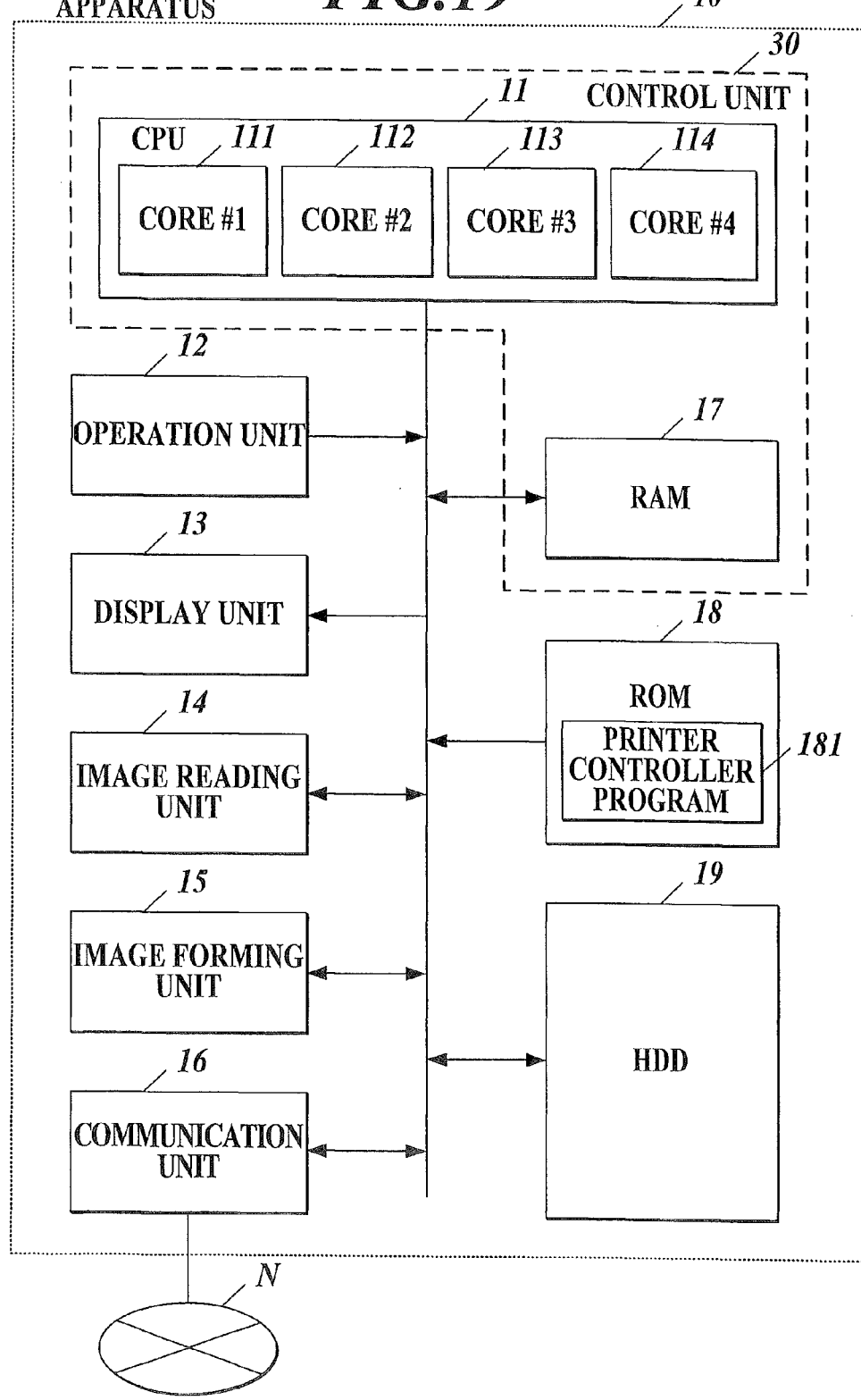
FIG. 19 is a block diagram of an image forming apparatus of the second embodiment.

Next, the second embodiment of the present invention will be described. The second embodiment differs from the image forming apparatus 10 of the first embodiment in that a CPU 11 provided with four cores is used as the CPU 11 used in the control unit 30 of the image forming apparatus 10 as shown in FIG. 19. Here, other structures are similar to the structures of the image forming apparatus 10 of the first embodiment. Therefore, same symbols are used to the corresponding structures and the descriptions are omitted. Further, the rasterizing process to be executed in the third core 113 and the fourth core 114 is same as the rasterizing process of core #2 in the first embodiment. Therefore, the description is omitted.

Next, the rasterizing method determination process to be executed in the second embodiment will be described with reference to FIG. 20.

Figure 20:
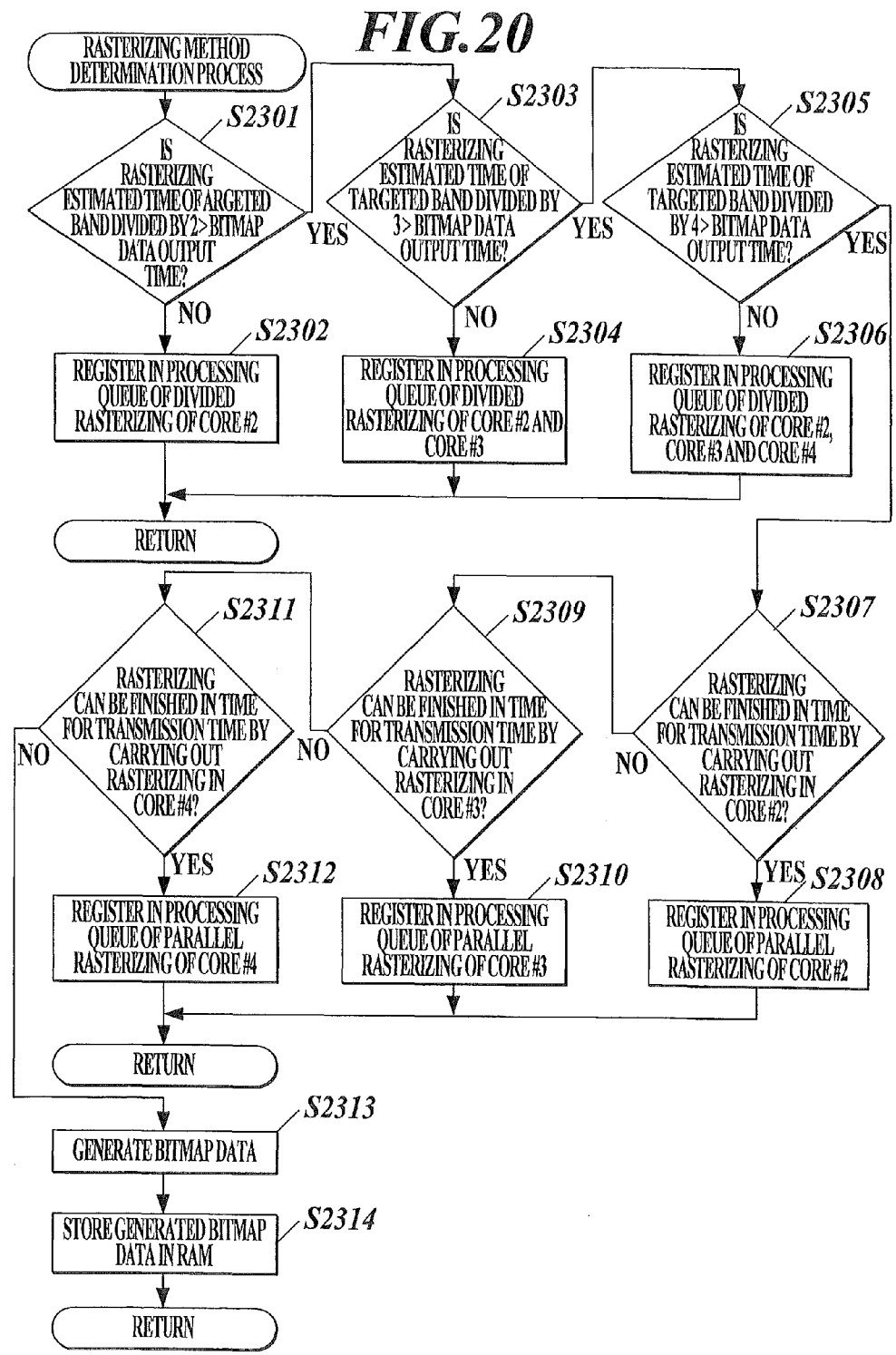
FIG. 20 is a flowchart showing a rasterizing method determination process of the second embodiment.

When the rasterizing method determination process in the rasterizing process shown in FIG. 7 is executed, the control unit 30 determines whether half of the rasterizing estimated time of the targeted band is greater than the bitmap data output time or not as shown in FIG. 20 (step S2301). When the control unit 30 does not determine that half of the rasterizing estimated time of the targeted band is greater than the bitmap data output time (step S2301: N), the control unit 30 divides the targeted band in two and registers the divided band in a processing queue of the second core 112 as the band in which divided rasterizing is to be carried out to the divided bands in two cores of the first core 111 and the second core 112 (step S2302). Here, when divided rasterizing is to be carried out in two cores, the cores to be used are not fixed to the first core 111 and the second core 112, and any two cores can be selected to be used from the four cores. Then, when the process of step S2302 is executed, the control unit 30 finishes the process.

Moreover, when the control unit 30 determines that half of the rasterizing estimated time of the targeted band is greater than the bitmap data output time (step S2301: Y), the control unit 30 determines whether ⅓ of the rasterizing estimated time of the targeted band is greater than the bitmap data output time or not (step S2303). That is, the control unit 30 determines whether bitmap data cannot be generated within the bitmap data output time or not even when rasterizing of the targeted band is carried out in three cores of the CPU 11.

When the control unit 30 does not determine that ⅓ of the rasterizing estimated time of the targeted band is greater than the bitmap data output time, that is, when the control unit 30 determines that the bitmap data can be generated within the bitmap data output time when the rasterizing of the targeted band is carried out in three cores (step S2303: N), the control unit 30 divides the targeted band in three and registers the divided bands in the processing queues of the second core 112 and the third core 113 as the bands to be carried out in three cores of the first core 111, the second core 112 and the third core 113 (step S2304). Here, in a case when divided rasterizing is to be carried out in three cores, the cores to be used are not fixed to the first core 111, the second core 112 and the third core 113, and any three cores can be selected to be used among the four cores. Then, when the process of step S2304 is executed, the control unit 30 finishes the process.

Further, when the control unit 30 determines that ⅓ of the rasterizing estimated time of the targeted band is greater than the bitmap data output time in step S2303 (step S2303: Y), the control unit 30 determines whether ¼ of the rasterizing estimated time of the targeted band is greater than the bitmap data output time or not (step S2305). That is, the control unit 30 determines whether the bitmap data cannot be generated within the bitmap data output time or not even when the rasterizing of the targeted band is carried out in four cores of the CPU 11.

When the control unit 30 does not determine that ¼ of the rasterizing estimated time of the targeted band is greater than the bitmap data output time, that is, when the control unit 30 determines that the bitmap data can be generated within the bitmap data output time when the rasterizing of the targeted band is carried out in the four cores (step S2305: N), the control unit 30 divides the targeted band in four and registers the divided bands in the processing queues of the second core 112, the third core 113 and the fourth core 114 as the bands to which divided rasterizing is carried out in the four cores of the first core 111, the second core 112, the third core 113 and the fourth core 114 (step S2306) and finishes the process.

Further, when the control unit 30 determines that ¼ of the rasterizing estimated time of the targeted band is greater than the bitmap data output time in step S2305 (step S2305: Y), the control unit 30 determines whether the bitmap data can be generated in time for the output timing of the bitmap data of the targeted band by carrying out parallel rasterizing in the second core 112 in parallel with the rasterizing process in the first core 111 among the four cores of the CPU 11 or not (step S2307).

When the control unit 30 determines that the bitmap data can be generated in time for the output timing of the bitmap data of the targeted band when parallel rasterizing is carried out in the second core 112 (step S2307: Y), the control unit registers the targeted band in the processing queue of the second core 112 as the band to which parallel rasterizing is to be carried out (step S2308) and thereafter, finishes the process.

Moreover, when the control unit 30 does not determine that the bitmap data can be generated in time for the output timing of the bitmap data of the targeted band when parallel rasterizing is carried out in the second core 112 (step S2307: N), the control unit 30 determines whether the bitmap data can be generated in time for the output timing of the bitmap data of the targeted band by carrying out parallel rasterizing in the third core 113 in parallel with the rasterizing process in the first core 111 or not (step S2309).

When the control unit 30 determines that the bitmap data can be generated in time for the output timing of the bitmap data of the targeted band when parallel rasterizing is carried out in the third core 113 (step S2309: Y), the control unit registers the targeted band in the processing queue of the third core 113 as the band to which parallel rasterizing is to be carried out (step S2310) and thereafter, finishes the process.

Further, when the control unit 30 does not determine that the bitmap data can be generated in time for the output timing of the bitmap data of the targeted band when parallel rasterizing is carried out in the third core 113 (step S2309: N), the control unit 30 determines whether the bitmap data can be generated in time for the output timing of the bitmap data of the targeted band by carrying out parallel rasterizing in the fourth core 114 in parallel with the rasterizing process in the first core 111 or not (step S2311).

When the control unit 30 determines that the bitmap data can be generated in time for the output timing of the bitmap data of the targeted band when parallel rasterizing is carried out in the fourth core 114 (step S2311: Y), the control unit 30 registers the targeted band in the processing queue of the fourth core 114 as the band to which parallel rasterizing is to be carried out (step S2312) and thereafter, finishes the process.

Further, when the control unit 30 does not determine that the bitmap data can be generated in time for the output timing of the bitmap data of the targeted band when parallel rasterizing is carried out in the fourth core 114 (step S2311: N), the control unit 30 carries out pre-rendering for the targeted band (step S2313). Then, the control unit 30 stores the generated bitmap data in the RAM 17 (step S2314) and thereafter, finishes the process.

In such way, in the second embodiment, because the CPU 11 having four cores is used, opportunities to carry out divided rasterizing increases even when a rasterizing time of a band is long. Therefore, executing of pre-rendering can be inhibited more and bitmap data is generated more efficiently, and print speed can be improved.

Next, the divided rasterizing process in the second embodiment will be described with reference to FIG. 21.

Figure 21:
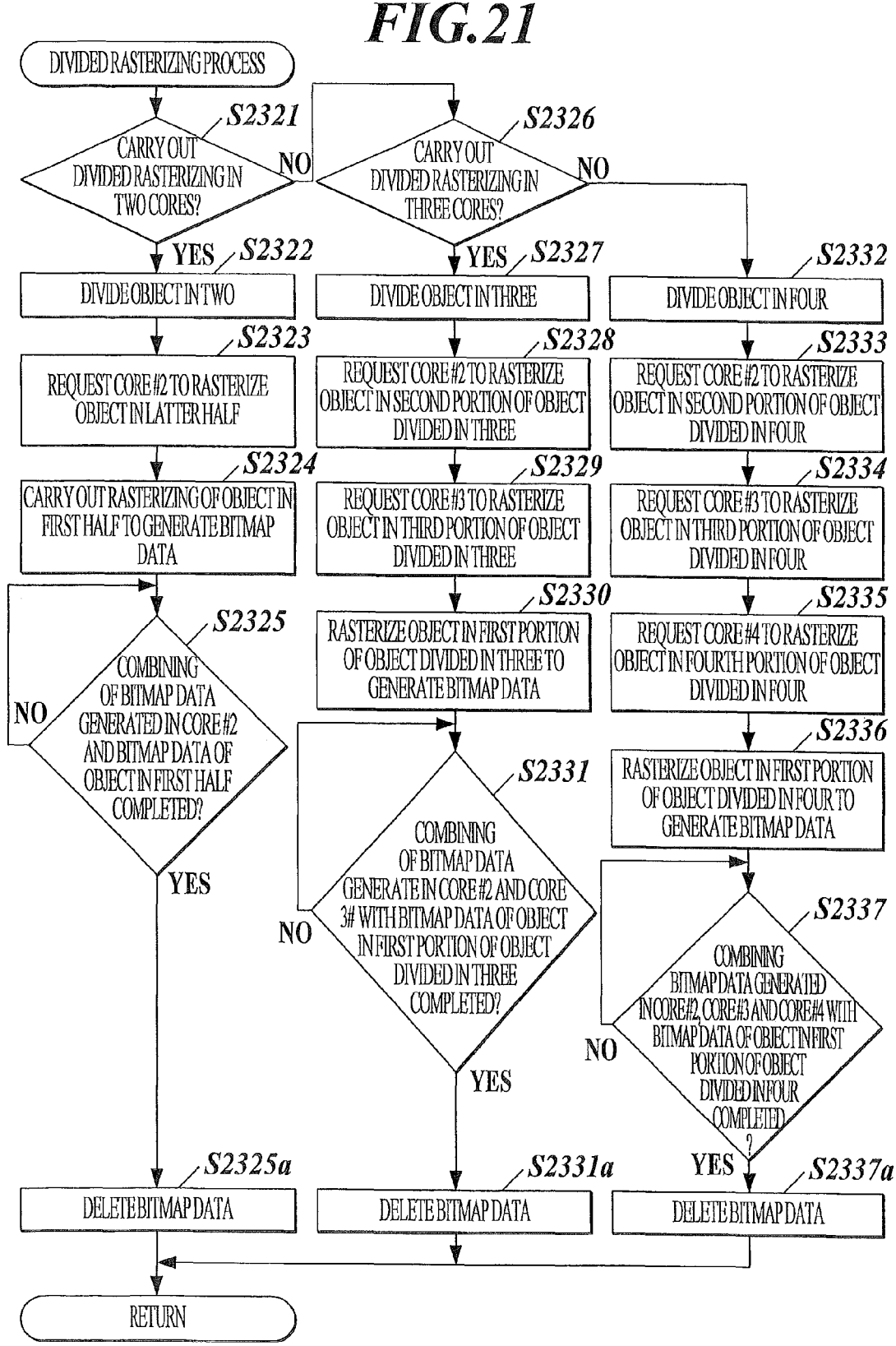
FIG. 21 is a flowchart showing a divided rasterizing process of the second embodiment.
Figure 22:
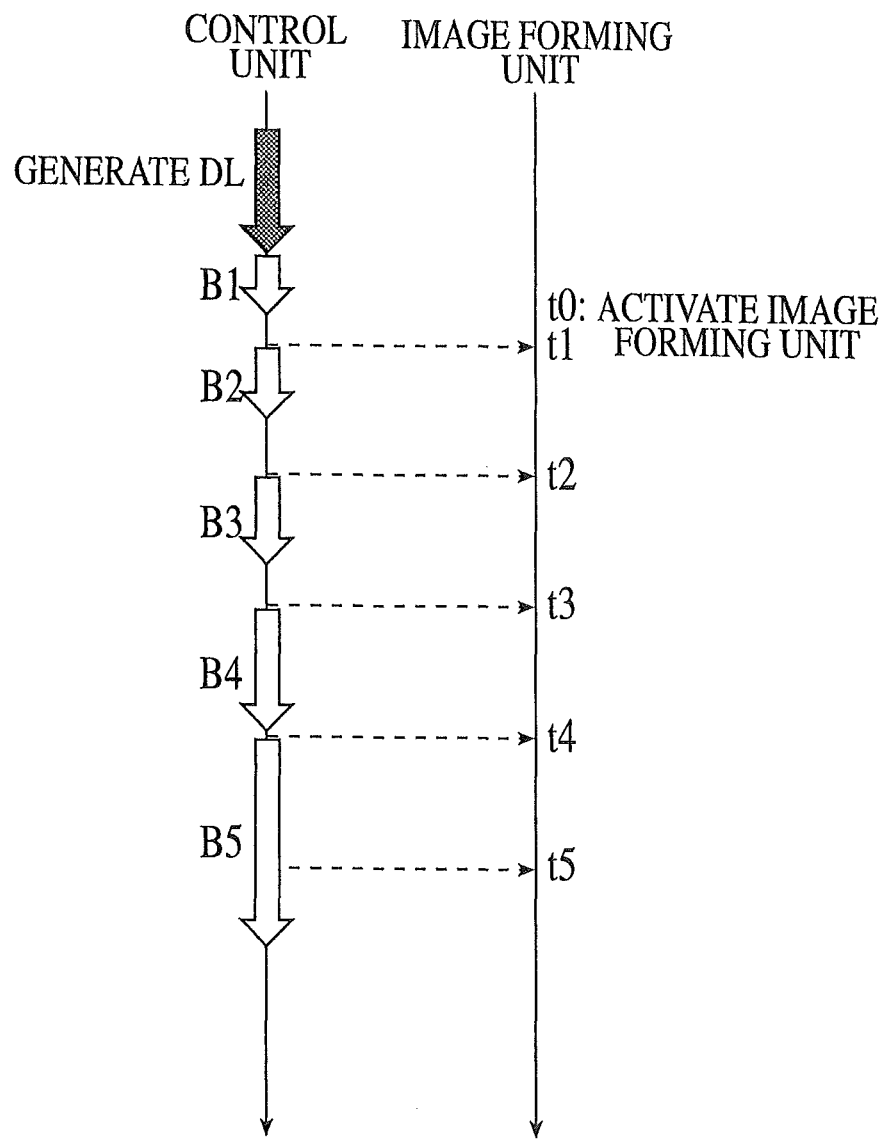
FIG. 22 is a diagram for explaining a processing operation of a conventional image processing apparatus.

When the divided rasterizing process in the rasterizing process shown in FIG. 7 is executed, the control unit 30 determines whether divided rasterizing is to be carried out in two cores or not for the band, that is, whether divided rasterizing is to be carried out in the first core 111 and the second core 112 or not for the band (step S2321) as shown in FIG. 21.

When the control unit 30 determines that divided rasterizing is to be carried out in two cores (step S2321: Y), the control unit 30 divides a plurality of objects structuring the band in two according to the predetermined arrangement order of the objects (step S2322) and requests the second core 112 to rasterize the objects arranged in later half of the divided plurality of objects (step S2323).

Then, the control unit 30 generates bitmap data of the objects arranged in first half of the divided plurality of objects on a band buffer (step S2324) and waits the bitmap data generated in the second core 112 to be overwritten and combined on the bitmap data generated on the band buffer (step S2325), and then, deletes the bitmap data on a work area which is generated in the second core 112 (step S2325*a*) and finishes the process.

Further, when the control unit 30 does not determine to carry out divided rasterizing in two cores in step S2321 (step S2321: N), the control unit 30 determines whether divided rasterizing in three cores is to be carried out for the band or not, that is, whether divided rasterizing is to be carried out in the first core 111, the second core 112 and the third core 113 or not (step S2326).

When the control unit 30 determines to carry out divided rasterizing in three cores (step S2326: Y), the control unit 30 divides a plurality of objects of the band in three according to a predetermined arranged order of the objects (step S2327) and requests the second core 112 to carry out rasterizing of the objects which are arranged in the second group among the plurality of objects divided in three (step S2328). Further, the control unit 30 requests the third core 113 to carry out rasterizing of the objects arranged in the third group among the plurality of objects divided in three (step S2329).

Then, the control unit 30 generates bitmap data of the object arranged in the first group among the objects divided in three on a band buffer (step S2330) and waits for the bitmap data generated in the second core 112 and the bitmap data generated in the third core 113, in this order, to be respectively overwritten and combined on the bitmap data generated on the band buffer (step S2331), and then, deletes the bitmap data on the work area which are generated in the second core 112 and the third core 113 (step S2331*a*) and finishes the process.

Further, when the control unit 30 does not determine that divided rasterizing is to be carried out in three cores (step S2326: N) in step s2326, it is decided to carry out divided rasterizing in four cores and the control unit 30 divides the plurality of objects structuring the band in four according to a predetermined arrangement order of the objects (step S2332) and requests the second core 112 to carry out rasterizing of the objects arranged in the second group among the plurality of objects divided in four (step S2333). Further, the control unit 30 requests the third core 113 to carry out rasterizing of the objects arranged in the third group among the plurality of objects divided in four (step S2334). Further, the control unit 30 requests the fourth core 114 to carry out rasterizing of the objects arranged in the fourth group among the plurality of objects divided in four (step S2335).

Then, the control unit 30 generates bitmap data of the objects arranged in the first group among the plurality of objects divided in four on the band buffer (step S2336) and waits for the bitmap data generated in the second core 112, the bitmap data generated in the third core 113 and the bitmap data generated in the fourth cores 114, in this order, to be respectively overwritten and combined on the bitmap data generated on the band buffer (step S2337), and then, deletes the bitmap data on the work area which are generated in the second core 112, the third core 113 and the fourth core 114 (step S2337*a*) and finishes the process.

In such way, according to the second embodiment, divided rasterizing can be carried out in a similar way as in the first embodiment even when four cores are used.

As described above, according to the first and the second embodiments, the control unit 30 includes a plurality of cores 111, 112 (113, 114). Further, the control unit 30 generates print data by carrying out the rasterizing process of a page in band unit constituted by a predetermined number of lines based on the control data for page print which is inputted by the client terminal 20. Then, the control unit 30 sequentially outputs the generated print data at the output timings which is defined by a constant output interval in band unit. Thereafter, when the control unit 30 determines that generation of print data can be completed within the output interval for all of the bands in a page, the control unit 30 makes either one of the plurality of cores 111, 112 (113, 114) carry out rasterizing process of each band. Further, the control unit 30 starts the rasterizing process to each of the bands by the designated core 111, 112 (113, 114) in a constant outputting interval from the first band to generate print data, and outputs the generated print data at the output timing which is corresponded to the band. Furthermore, when the control unit 30 determines that generating of print data for the band, which is any one of the band in a page, cannot be completed within the output interval, the control unit 30 executes the rasterizing process for one or a plurality of bands in two or more cores among the plurality of cores 111, 112 (113, 114) to generate print data so that the generation of print data of the band can be finished in time for the output timing corresponded to the band and outputs the generated print data at the output timing corresponded to the band. Then, the image forming unit 15 forms an image based on the print data outputted by the control unit 30. As a result, a situation where the print data cannot be generated in time for output in a predetermined output interval can be prevented by carrying out generation of print data in parallel by two or more cores even when the print data cannot be outputted in band unit in the predetermined output interval when rasterizing is carried out in one core. Further, the above can be realized without making the memory region be unnecessarily large and overrun can be avoided efficiently by inhibiting increase of the memory region and decrease in image forming speed.

Moreover, according to the first and the second embodiments, when the control unit 30 determines that generation of print data cannot be completed within the output interval even when the print data of the band is generated in parallel in two or more cores among the plurality of cores 111, 112 (113, 114) for any one of the band in a page, the control unit 30 generates print data for the band before carrying out rasterizing process for the first band. As a result, in a case where generation of print data cannot be finished in time for outputting of the print data even when the generation o the print data is carried out in parallel at the same time by two or more cores, overrun can be avoided more surely by generating the print data of the band in advance.

Further, according to the first and the second embodiments, the control unit calculates the processing time for generating print data for each band based on the control data for page print, and when the processing time is greater than the output interval, the control unit determines that the generation of print data cannot be completed within the output interval. As a result, by calculating the print data generation processing time for each band, whether the generation of print data can be finished in time or not can be easily determined.

Furthermore, according to the first and the second embodiments, when the control unit 30 determines that the generation of print data cannot be finished within the output interval, the control unit 30 determines which of the plurality of cores 111, 112 (113, 114) can generated print data. Then, the control unit 30 executes the rasterizing process for one or a plurality of bands in parallel in two or more of the plurality of cores 111, 112 (113, 114) which are determined to be available to generate print data. As a result, the cores to be used for generating the print data can be selected efficiently. Therefore, processing efficiency can be enhanced when generating the print data in parallel in two or more cores.

Moreover, according to the first and the second embodiments, when the control unit 30 determines that the generation of print data cannot be finished within the output interval, while print data of other band is being generated in one of the cores 111, 112 8113, 114), the control unit 30 allows generation of the print data to be carried out in parallel by other one or more cores 111, 112 (113, 114) for the band which is determined that the generation of print data cannot be finished within the output interval. As a result, as for the band which is determined that the generation of print data cannot be finished in time, the generation of print data can be carried out in plenty of time until the output timing of the print data, and also the generation of print data can be carried out after the image forming operation is started. Therefore, the image forming operation can be started promptly and the image forming speed can be improved.

Here, the descriptions of the first and the second embodiments are examples of the image forming apparatus according to the present invention, and the present invention is not limited to the descriptions. Each functional unit structuring the image forming apparatus and particular operations can be arbitrarily changed.

Further, in the first and the second embodiments, examples in which divided rasterizing, parallel rasterizing or pre-rendering is carried out for on band among a plurality of band in one page is described. However, divided rasterizing, parallel rasterizing or pre-rendering can be carried out for two or more bands among a plurality of bands.

Furthermore, in the first and the second embodiments, carrying out of divided rasterizing and parallel rasterizing is described as a method for carrying out rasterizing in a plurality of cores at the same time. However, only one of the above may be carried out.

Moreover, in the first and the second embodiments, the rasterizing estimated time is calculated for each band, and whether the output timing of bitmap data can be met or not is determined based on the calculated rasterizing estimated time. However, the determination can be carried out by other methods, for example, the determination can be based on the size of data of each band.

Further, in the first and the second embodiments, the regular rasterizing process is to be carried out in the first core 111. However, the regular rasterizing process can be carried out in other cores. Furthermore, the core in which rasterizing is to be carried out can be changed for each band, for example, when rasterizing is to be carried out in two cores, the core in which rasterizing is to be carried out can alternate for each band. Further, when rasterizing is carried out in one core and a display list is being created in other core, rasterizing can be made to be carried out in the core in which the display list was created.

Furthermore, in the first and the second embodiments, print data, display list and bitmap data are stored in the RAM 17. However, they can be stored in the HDD 19 or other storage mediums.

Moreover, in the first and the second embodiments, when an error such as paper jam due to paper jamming in the middle of image forming and paper mismatch due to inappropriate paper being filled occurs, bitmap data for one page which is generated may be copied in other region until image forming of the page is completed and the paper is ejected so that the error can be rescued. In such case, whether to carry out image forming again for the page in which error has occurred may be chosen by the operation unit 12 or the client terminal 20, for example.

Further, in the first and the second embodiment, an example in which a non-volatile memory and the like such as a hard disk and a semiconductor is used as a computer readable medium of the programs of the present invention is used is exemplified. However, the present invention is not limited to this example. A portable storage medium such as CD-ROM and the like can be used as other computer readable medium. Furthermore, a carrier wave can be used as a medium for supplying programs of the present invention via a communication circuit.

The entire disclosure of Japanese Patent Application No. 2010-012677 filed on Jan. 25, 2010 is incorporate herein by reference in its entirety.

What is claimed is:

1. An image forming apparatus which generates print data based on control data for printing a page, which is received from an external device, and which forms an image based on the print data, comprising:
a control unit including a plurality of arithmetic processing units, wherein the control unit is configured to perform the following operations with respect to a predetermined page based on the control data for printing the page:
divide the predetermined page in units of a band, each band constituted by a predetermined number of lines, generate a display list for each band unit,
generate the print data by carrying out a rasterizing process based on the display list of each band which is generated, and
sequentially output the generated print data at output timings defined in a constant output interval in units of a band; and
an image forming unit which forms an image based on the generated print data outputted from the control unit, wherein
the control unit is configured to determine whether generation of print data based on the display list generated for each band can be completed within the output interval for all of the bands in one page,
if the control unit determines that generation of print data can be completed within the output interval for all of the bands in one page:
designate any one arithmetic processing unit among the plurality of arithmetic processing units to carry out the rasterizing process for each band,
start the rasterizing process for each band by the designated arithmetic processing unit from a first band in the constant output interval to generate print data, and
output the generated print data at an output timing corresponding to each band, and
if the control unit determines that generation of print data based on the display list generated for each band can not to be completed within the output interval for any one band in one page:
execute a rasterizing process for one or a plurality of bands by using two or more arithmetic processing units among the plurality of arithmetic processing units in parallel to generate print data so that the generation of the print data of each band is finished in time for an output timing corresponding to that band, and
output the generated print data at the output timing corresponding to each band; and
the control unit is configured to designate at least one arithmetic processing unit which is not executing a rasterizing process among the plurality of arithmetic processing units to carry out dividing a page in units of a band and generating a display list for each band with respect to a page that comes after the predetermined page in parallel with the rasterizing process; wherein
the control unit is configured to determine which arithmetic processing units are available to execute a rasterizing process among the plurality of arithmetic processing units, and the control unit is configured to execute a first processing mode in which rasterizing processes of one or a plurality of bands are executed in parallel by at least two arithmetic processing units among the arithmetic processing units which are determined as being available to execute a rasterizing process, a second processing mode in which, while a rasterizing process of another band is executed in one arithmetic processing unit, a rasterizing process is executed for a band which is determined that the rasterizing process can not be completed within the output interval in parallel by another one or more arithmetic processing units, and a third processing mode in which a rasterizing process of any one band in the page is executed before a rasterizing process of a first band, and when the control unit determines that generation of print data can not be completed within the output interval, the control unit is configured to determine whether generation of print data can be completed within the output interval by executing the first processing mode, when the control unit determines that generation of print data can not be completed within the output interval even if the first processing mode is executed, the control unit is configured to determine whether generation of print data can be completed within the output interval by executing the second processing mode, and when the control unit determines that generation of print data can not be completed within the output interval even when the second processing mode is executed, the control unit is configured to execute the third processing mode.

2. The image forming apparatus of claim 1, wherein
the control unit is configured to, based on the generated display list of each band, calculate a processing time needed for rasterizing the display list for each band, and
when the processing time is greater than the output interval, the control unit is configured to determine that the print data can not be generated within the output interval.

3. A non-transitory computer readable recording medium storing a program for causing a computer having a plurality of arithmetic processing units to perform the following functions with respect to a predetermined page based on control data for printing a page:

dividing the predetermined page in units of a band, each band constituted by a predetermined number of lines;
generating a display list for each band unit;
determining whether generation of print data based on the display list generated for each band can be completed within an output interval for all of the bands in one page;
if the computer determines that generation of the print data can be completed within the output interval for all of the bands in one page, designating any one arithmetic processing unit among the plurality of arithmetic processing units to carry out a rasterizing process for each band, starting the rasterizing process of each band by the designated arithmetic processing unit from a first band in the constant output interval to generate print data, and outputting the generated print data at an output timing corresponding to each band;
if the computer determines that generation of the print data based on the display list generated for each band can not be completed within the output interval for any one band in one page, executing a rasterizing process for one or a plurality of bands by using two or more arithmetic processing units among the plurality of arithmetic processing units in parallel to generate print data so that a generation of print data of one band can be finished in time for an output timing corresponding to each band, and outputting the generated print data at the output timing corresponding to each band;
designating at least one arithmetic processing unit which is not executing a rasterizing process among the plurality of arithmetic processing units to carry out dividing a page in units of a band and generating a display list for each band with respect to a page that comes after the predetermined page in parallel with the rasterizing process; and forming, with an image forming unit, an image based on the print data outputted;
wherein the program further causes the computer to perform the functions of:
determining which arithmetic processing units are available to execute a rasterizinq process among the plurality of arithmetic processing units;
executing a first processing mode in which rasterizing processes of one or a plurality of bands are executed in parallel by at least two arithmetic processing units among the arithmetic processing units which are determined as being available to execute a rasterizing process, a second processing mode in which, while a rasterizing process of an other band is executed in one arithmetic processing unit, a rasterizinq process is executed for a band which is determined that the rasterizing process can not be completed within the output interval in parallel by an other one or more arithmetic processing units, and a third processing mode in which a rasterizinq process of any one band in the page is executed before a rasterizinq process of a first band;
when it is determined that generation of print data can not be completed within the output interval, determining whether generation of print data can be completed within the output interval by executing the first processing mode;
when it is determined that generation of print data can not be completed within the output interval even if the first processing mode is executed, determining whether generation of print data can be completed within the output interval by executing the second processing mode; and
when it is determined that generation of print data can not be completed within the output interval even when the second processing mode is executed, executing the third processing mode.

4. The computer readable recording medium of claim 3, wherein
the program causes the computer to, based on the generated display list of each band, calculate a processing time needed for rasterizing the display list for each band, and
when the processing time is greater than the output interval, the computer determines that the print data can not be generated within the output interval.

5. A method implemented on an image forming apparatus which generates print data based on control data for printing a page, which is received from an external device, and which forms an image based on the print data, the method comprising:

dividing, with a control unit including a plurality of arithmetic processing units, a predetermined page in units of a band, each band constituted by a predetermined number of lines;
generating, with the control unit, a display list for each band unit;
determining, with the control unit, whether generation of print data based on the display list generated for each band can be completed within an output interval for all of the bands in one page;
if the control unit determines that generation of the print data can be completed within the output interval for all of the bands in one page, designating any one arithmetic processing unit among the plurality of arithmetic processing units to carry out a rasterizing process for each band, starting the rasterizing process of each band by the designated arithmetic processing unit from a first band in the constant output interval to generate print data, and outputting the generated print data at an output timing corresponding to each band;

if the control unit determines that generation of the print data based on the display list generated for each band can not be completed within the output interval for any one band in one page, executing a rasterizing process for one or a plurality of bands by using two or more arithmetic processing units among the plurality of arithmetic processing units in parallel to generate print data so that a generation of print data of one band can be finished in time for an output timing corresponding to each band, and outputting the generated print data at the output timing corresponding to each band;

designating at least one arithmetic processing unit which is not executing a rasterizing process among the plurality of arithmetic processing units to carry out dividing a page in units of a band and generating a display list for each band with respect to a page that comes after the predetermined page in parallel with the rasterizing process; and forming, with an image forming unit, an image based on the print data outputted;

determining which arithmetic processing units are available to execute a rasterizing process among the plurality of arithmetic processing units;

executing a first processing mode in which rasterizing processes of one or a plurality of bands are executed in parallel by at least two arithmetic processing units among the arithmetic processing units which are determined as being available to execute a rasterizing process, a second processing mode in which, while a rasterizing process of an other band is executed in one arithmetic processing unit, a rasterizinq process is executed for a band which is determined that the rasterizing process can not be completed within the output interval in parallel by an other one or more arithmetic processing units, and a third processing mode in which a rasterizinq process of any one band in the page is executed before a rasterizing process of a first band;

when it is determined that generation of print data can not be completed within the output interval, determining whether generation of print data can be completed within the output interval by executing the first processing mode;

when it is determined that generation of print data can not be completed within the output interval even if the first processing mode is executed, determining whether generation of print data can be completed within the output interval by executing the second processing mode; and when it is determined that generation of print data can not be completed within the output interval even when the second processing mode is executed, executing the third processing mode.

* * * * *